United States Patent
Vaarlid et al.

(10) Patent No.: US 11,604,534 B2
(45) Date of Patent: Mar. 14, 2023

(54) RECOGNIZING AN OBJECT USING CAPACITIVE SENSING

(71) Applicant: Microchip Technology Incorporated, Chandler, AZ (US)

(72) Inventors: Johan Vaarlid, Trondelag (NO); Petter Diderik Breedveld, Trøndelag (NO)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 17/249,925

(22) Filed: Mar. 18, 2021

(65) Prior Publication Data
US 2021/0302208 A1 Sep. 30, 2021

Related U.S. Application Data

(60) Provisional application No. 63/001,097, filed on Mar. 27, 2020.

(51) Int. Cl.
*G06F 3/041* (2006.01)
*G06F 3/044* (2006.01)
*G06F 3/04817* (2022.01)

(52) U.S. Cl.
CPC .......... *G06F 3/0416* (2013.01); *G06F 3/0446* (2019.05); *G06F 3/04817* (2013.01); *G06F 3/04186* (2019.05); *G06F 2203/04108* (2013.01)

(58) Field of Classification Search
CPC ........ G06F 3/044; G06F 3/0416; G06F 3/041; G06F 3/04886; G06F 3/04883;
(Continued)

(56) References Cited

U.S. PATENT DOCUMENTS 8,358,286 B2 * 1/2013 Cannon ............... G06F 3/04883
345/174
9,274,641 B2 3/2016 Heatherly et al.
(Continued)

OTHER PUBLICATIONS

International Search Report from International Application No. PCT/US2021/070285, dated Jun. 8, 2021, 4 pages.
(Continued)

*Primary Examiner* — Darlene M Ritchie
(74) *Attorney, Agent, or Firm* — TraskBritt

(57) ABSTRACT

Some embodiments of the present disclosure may include a controller for an object-recognition system. The controller may include a capacitive-sensor-button controller configured to provide a button-status report at least partially responsive to proximity of the object to specified areas of a capacitive sensor. The controller may also include a recognizer configured to generate an object identifier at least partially responsive to the button-status report when an object having a plurality of detectable elements in a predetermined spatial pattern is in proximity thereof. Some embodiments of the present disclosure may include a controller for an object-recognition system. The controller may include a reader configured to capture channel-capacitance measurements of a capacitive sensor. The controller may also include a recognizer configured to generate an object identifier at least partially responsive to a set of channel-capacitance measurements captured by the reader when the object is in proximity to the capacitive sensor.

10 Claims, 13 Drawing Sheets

(58) Field of Classification Search
CPC .. G06F 3/0414; G06F 3/0446; G06F 3/04817; G06F 3/04186; G06F 3/04108
See application file for complete search history.

(56) References Cited

U.S. PATENT DOCUMENTS

| | | | |
|---|---|---|---|
| 10,386,974 | B2 | 8/2019 | Sadahiro et al. |
| 2012/0182225 | A1 | 7/2012 | Brosnan |
| 2013/0065482 | A1* | 3/2013 | Trickett ................. A63H 18/16 446/431 |
| 2013/0314375 | A1 | 11/2013 | Rickstrom et al. |
| 2015/0265934 | A1* | 9/2015 | Taylor .................... A63F 13/98 446/484 |
| 2015/0363585 | A1 | 12/2015 | Gooding et al. |
| 2016/0210484 | A1* | 7/2016 | Shi ....................... A63F 13/573 |
| 2016/0334920 | A1* | 11/2016 | Park ....................... G06F 3/045 |
| 2017/0003720 | A1* | 1/2017 | Robinson ............. G06F 1/1632 |
| 2017/0061824 | A1* | 3/2017 | Kernan ................ A63H 33/042 |
| 2017/0296938 | A1* | 10/2017 | Dawes ................. A63H 33/086 |
| 2017/0329433 | A1* | 11/2017 | Abzarian ............. G06F 3/0446 |

OTHER PUBLICATIONS

International Written Opinion from International Application No. PCT/US2021/070285, dated Jun. 8, 2021, 8 pages.

\* cited by examiner

RECOGNIZING AN OBJECT USING CAPACITIVE SENSING

CROSS-REFERENCE TO RELATED APPLICATION

This application claims the benefit of the priority date of U.S. Provisional Patent Application No. 63/001,097, filed Mar. 27, 2020, and titled "RECOGNIZING A NON-GROUNDED OBJECT USING MUTUAL-CAPACITIVE SENSING," the disclosure of which is incorporated herein in its entirety by this reference.

FIELD

This description relates, generally, to recognizing objects, including non-grounded objects using capacitance sensing.

BACKGROUND

A capacitive touch sensor may be configured to detect changes in channel capacitance at one or more sensor locations of the capacitive touch sensor.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

Figure 1:
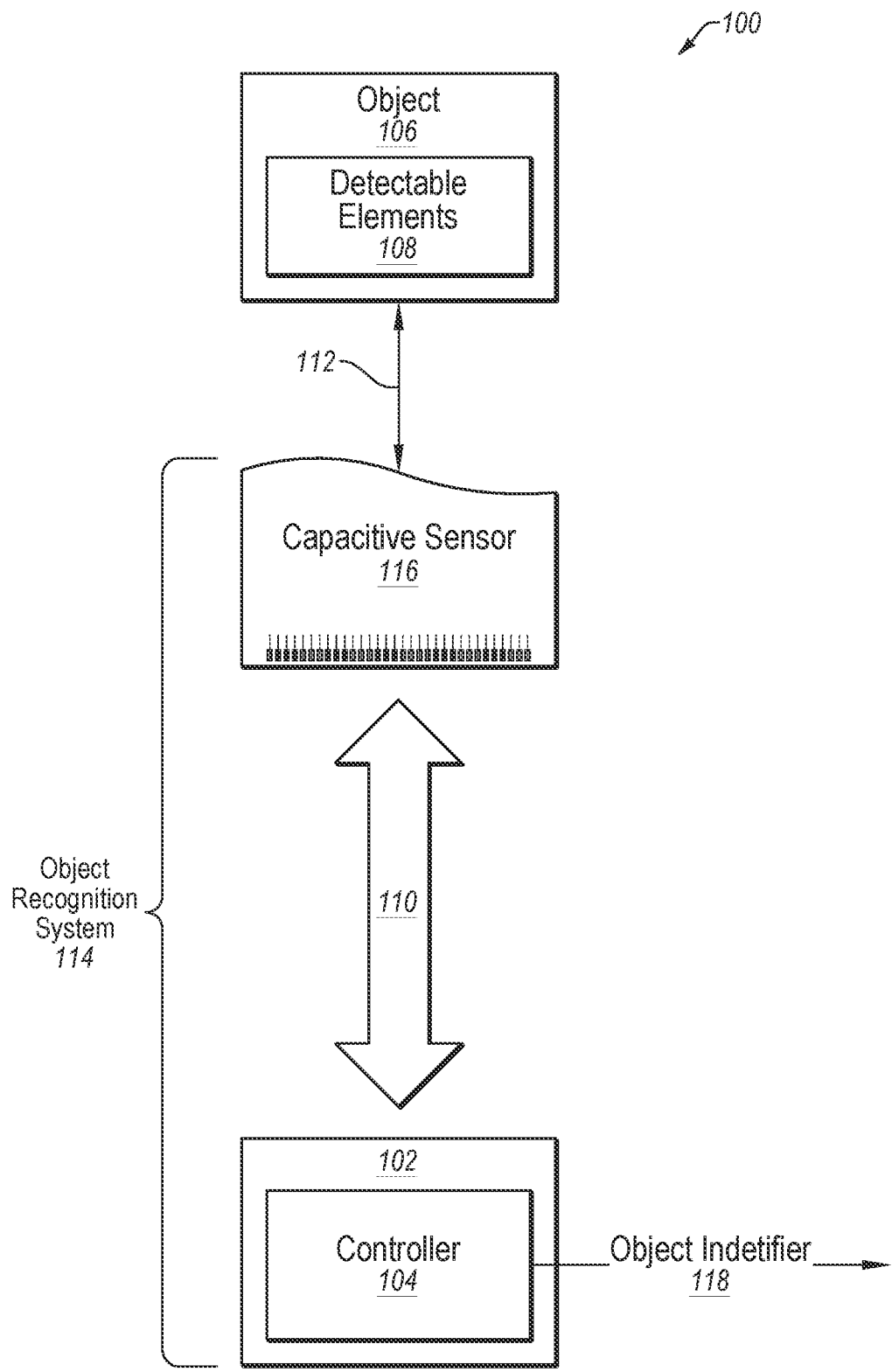
FIG. 1 illustrates a system in which one or more embodiments of the present disclosure may operate.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawing could be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be depicted by block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, and symbols that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal. A person having ordinary skill in the art would appreciate that this disclosure encompasses communication of quantum information and qubits used to represent quantum information.

The various illustrative logical blocks, modules, and circuits described in connection with the embodiments disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, or a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

In this description, the term "coupled" and derivatives thereof may be used to indicate that two elements co-operate or interact with each other. When an element is described as being "coupled" to another element, then the elements may be in direct physical or electrical contact or there may be intervening elements or layers present. In contrast, when an element is described as being "directly coupled" to another element, then there are no intervening elements or layers present. The terms "on" and "connected" may be used in this description interchangeably with the term "coupled," and have the same meaning unless expressly indicated otherwise or the context would indicate otherwise to a person having ordinary skill in the art.

One or more embodiments of the present disclosure generally relate to systems and methods for object recognition using a capacitive sensor. The capacitive sensor may include a mutual capacitance sensor. The mutual capacitance sensor may be configured to detect capacitance of a grounded or non-grounded object in proximity of the mutual capacitance sensor. In the present disclosure, the term "proximity" may include physical contact between the object and the capacitive sensor, and includes within sufficient proximity to be reliably detected by the capacitive sensor. Additionally, in the present disclosure, the term "object" refers to an object having a plurality of detectable elements in a predetermined spatial pattern. The object may be grounded, or non-grounded. The systems and methods for object recognition may be capable of object recognition even in cases where there is no electrical connection between the capacitive sensor and the detectable elements in the object. For example, the detectable elements may be entirely embedded in a non-conducting material, such as within a plastic, while still being detectable. There is no requirement for an electrical connection between the capacitive sensor and the object.

As a specific non-limiting example, of an environment in which embodiments of the present disclosure may be used, an object may include multiple detectable elements, which may be arranged at or near a surface of the object. The detectable elements may be detectable by a capacitive sensor when the surface is brought within proximity of the capacitive sensor.

There may be a correlation between the particular predetermined spatial pattern of the detectable elements in the object and an object identifier. As a non-limiting example, the detectable elements may be arranged in the object according to a recognition schema that correlates the particular predetermined spatial pattern of the detectable elements with an object identifier. As another example, a recognition schema may be configured to include a correlation between the particular predetermined spatial pattern of the detectable elements in the object and an object identifier.

As a specific non-limiting example, the detectable elements may be arranged in the object according to a two-dimensional grid. The two-dimensional grid may be conceptualized as a bitmap e.g., an m-by-n grid may describe m*n bits of data where the presence of a detectable element indicates a "1," and the absence of a detectable element indicates a "0." Thus, an arrangement of detectable elements in the grid, i.e., the particular predetermined spatial pattern, may be encodable into a number that may be included in the object identifier according to the recognition schema.

Thus, one or more embodiments of the present disclosure may include an object-recognition system including a capacitive sensor and a controller. The capacitive sensor may be configured to detect the particular predetermined spatial pattern of detectable elements in an object and the controller may be configured to generate an object identifier in response to the particular predetermined spatial pattern.

One non-limiting example application in which the object-recognition system may be used is a game board. The object-recognition system may be included in one or more portions of the game board and one or more pieces of a game may include arrangements of detectable elements according to one of plurality of predetermined spatial patterns. The object-recognition system within the game board may be configured to recognize the pieces, and/or the spatial relationship between the pieces and the game board based on detecting the predetermined spatial patterns of the detectable elements in proximity of the game board.

Another non-limiting example application in which the object-recognition system may be used is in physical security and/or identification. The object-recognition system could be associated with access, e.g., a lock on a door or a digital access. Detectable elements could be arranged in accordance with one of a plurality of predetermined spatial patterns in another object that could be used as a key. The object-recognition system may be configured to provide an identifier and/or grant or restrict access based on detecting the particular predetermined spatial pattern of detectable elements in the object.

Another non-limiting example application in which the object-recognition system may be used is in object validation or identification e.g., for modules of a modular system. One example of a modular system is a tool or appliance that is capable of being configured with different attachments. As a non-limiting example, a tool may be configured to attach to one of several different attachments. The tool may include an object-recognition system and each of the several different attachments may include one of a plurality of predetermined spatial patterns of detectable elements. The object-recognition system of the tool may be configured to identify which attachment is attached to the tool based on detecting which particular predetermined spatial pattern of detectable elements is in the attached attachment.

FIG. 1 illustrates system 100 in accordance with one or more embodiments. System 100 includes object-recognition system 114, object 106 including detectable elements 108, capacitive sensor 116, and controller 104 implemented in a microcontroller (MCU) 102.

Object-recognition system 114 may include capacitive sensor 116, controller 104, and connections 110 between capacitive sensor 116 and controller 104. In general, object-recognition system 114 may be configured to generate object identifier 118 in response to proximity 112 between detectable elements 108 of object 106 and capacitive sensor 116, where the detectable elements 108 exhibit a predetermined spatial pattern. Notably, the predetermined spatial pattern exhibited by detectable elements 108 of object 106 may be characterized as a data store that stores an object identifier 118 for object 106. Further, object identifier 118 is not limited to identifying information for object 106, and references herein to the term "object identifier" (e.g., object identifier 118, object identifier 316, and object identifier 618, without limitation) should be understood to include any information about an object or conveyed with an object.

Object 106 may be, or may include, any object or item suitable to include or support detectable elements 108, and this description is not limited to any specific object, as the specific applications will typically inform characteristics of object 106 such as type, materials, shape, size, and assembly, without limitation. Moreover, object 106 may include a solid portion capable of supporting detectable elements 108 and/or physical features capable of retaining detectable elements 108 in and/or on object 106, in one of one or more specific predetermined spatial patterns. Non-limiting examples of objects 106 that may be configured to include detectable elements 108 include: game pieces, toys, automobile and building keys, store value cards, bank cards, credit cards, attachments to tools or appliances, replaceable parts, and containers of consumable products (e.g., printer cartridges).

Detectable elements 108 may be, or may include, anything capable of being detected by a capacitive sensor when in proximity thereof. Detectable elements 108 may be, or may include, a material having a different (e.g., higher) electrical permittivity than a material of object 106 that retains detectable elements 108. As a non-limiting example, a portion of object 106 that retains detectable elements 108 may be formed of plastic, and detectable elements 108 may be formed of one or more suitable materials such as conductors (e.g., metal or conductive ceramic, without limitation) embedded in the plastic. In some embodiments, detectable elements 108 may be elements generally unrelated to a function of object 106, and in other embodiments, some detectable elements 108 may be elements generally unrelated to a function of object 106 and some detectable elements 108 may be elements generally related to a function of object 106. As a non-limiting example, some materials used in the manufacture and/or assembly of a power drill may be detectable via capacitive sensing, such as metal parts. In some cases, such materials may sufficiently exhibit a spatial pattern, which a disclosed object recognizer (e.g., recognizer 304 and recognizer 602, without limitation) may identify an object as a power drill. Further, different manufacturers may arrange some such materials similarly and may arrange some such materials differently within a power drill. So, in some cases differences in the spatial patterns exhibited by such materials may be sufficient for a disclosed object recognizer (e.g., recognizer 304 and recognizer 602, without limitation) to identify a manufacturer of a power drill. Further still, some detectable elements 108 unrelated to the function of a power drill may be added to identify an object or amplify differences in the spatial patterns exhibited by power drills having different manufacturers. Further still, some detectable elements 108 unrelated to the function of a power-drill may be added to provide information in addition to the type of object and/or manufacturer of an object, such as a unique identifier, a capability of an object, or where it was manufactured.

In one or more embodiments, object 106 may be configured (e.g., include physical features, without limitation) such that object 106 contacts a surface of capacitive sensor 116, or a cover over capacitive sensor 116, at specific locations of object 106. The specific locations of object 106 that contact the surface may be or include the detectable elements 108. As a non-limiting example, object 106 may include feet on a bottom surface of object 106. The feet may be arranged according to a predetermined spatial pattern and may be or include detectable elements 108 of object 106. In one or more embodiments, a shape of a contacting surface of object 106 and/or a contact sensing surface of capacitive sensor 116 may be chosen, as non-limiting examples, to be flat, curved or have some other geometric structure; may be or have a female/male type complimentary structure or may have a non-complimentary type structure. As further non-limiting examples, object 106 and/or capacitive sensor 116 may include one or more surfaces that are smooth, rough, bumpy, or otherwise textured, without limitation. Detectable elements 108 may be intended to be a permanent or semi-permanent part of object 106 (e.g., molded or mechanically integrated with object 106, without limitation) or intended to be removably or temporarily affixed to object 106 (e.g., by magnetic attachment, by adhesive, or by a or fastener (e.g., by a hook-and-loop fastener or a mechanical interference-based fastener, without limitation), without limitation).

Proximity 112 illustrates proximity between object 106 (including detectable elements 108) and capacitive sensor 116. As has been described above, capacitive coupling between detectable elements 108 and capacitive sensor 116 due to proximity 112 may cause a measurable change in the capacitance of capacitive sensor 116.

Capacitive sensor 116 may be configured to generate signals indicative of changes in capacitance at capacitive sensor 116 in response to proximity of detectable elements 108 of object 106 to one or more locations of a sensing surface of capacitive sensor 116 (such signals referred to hereafter as "sensing signals").

As a non-limiting example, capacitive sensor 116 may include multiple intersecting sensing lines where intersection of the sensor lines is associated with sensor locations by object-recognition system 114. The sensing signals generated by capacitive sensor 116 may be indicative of changes in capacitance at or near one or more of such locations/intersections.

Notably, the present disclosure is not limited to any specific arrangement, spacing, or number of detectable elements 108, sensor lines, or sensor locations. In one or more embodiments, capacitive sensor 116 may include one or more cover surfaces that are transparent, translucent, and/or opaque.

In one or more embodiments, controller 104 may be configured to measure capacitance or a change in capacitance in response to sensing signals with enough granularity as to be able to differentiate multiple levels of proximity. In these or other embodiments, capacitive sensor 116 and/or controller 104 may be configured to translate capacitance measurement from a sensing line and/or sensor location into one of multiple possible values. As a specific non-limiting example, a highest degree of measured capacitance may be translated into a "1.0," a lower degree of measured capacitance may be translated into a "0.5," and a lowest degree of measured capacitance may be translated into a "0." In these or other embodiments, detectable elements 108 in object 106 may be arranged according to multiple levels of proximity. As a specific non-limiting example, detectable elements 108 may be formed of different materials that cause different amounts of change of capacitance in capacitive sensor 116 and sensing signals generated in response thereto. Such differences may be measurable by controller 104. Additionally or alternatively, individual detectable elements 108 may be arranged at different depths (i.e., in three dimensions) within object 106 and/or on different surfaces of object 106 such that, when object 106 is brought into proximity 112 with capacitive sensor 116, some of detectable elements 108 will be closer than other detectable elements 108 to capacitive sensor 116.

Connections 110 between capacitive sensor 116 and controller 104 may include any combination of wired and unwired connections and circuit elements, shared or unshared, suitable to communicate sensing signals from capacitive sensor 116 to controller 104.

Controller 104 may include one or more input/output (I/O) ports configured to receive one or more sensing signals from capacitive sensor 116, (e.g., at the sensing lines and/or the sensor locations of capacitive sensor 116). In the present disclosure, digital signals generated at controller 104 at least partially in response to sensing signals are referred to as "channel-capacitance measurements." In some embodiments, controller 104 may be configured to capture channel-capacitance measurements.

Controller 104 may be configured to detect proximity, determine sensor locations that correspond to detected proximity, and generate object identifier 118 based on the captured channel-capacitance measurements as discussed herein. One or more of the features and functions of embodiments of controller 104 discussed herein may be implemented as one or more of: logical blocks, computing instructions, software modules, and integrated circuits.

FIG. 1 depicts controller 104 implemented in MCU 102. MCU 102 may be a microcontroller type system capable of implementing embodiments of controller 104 discussed herein. Although not depicted by FIG. 1, controller 104 may be implemented in any of: a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof.

Object identifier 118 may include data indicative of an identifier associated with object 106. As a specific non-limiting example, object identifier 118 may include data in any suitable format e.g., one or more n-bit binary numbers, without limitation. As discussed herein, in or more embodiments, object identifier 118 may be associated with object 106 by a particular predetermined spatial pattern of detectable elements 108 of object 106 according to a recognition schema.

Figure 2:
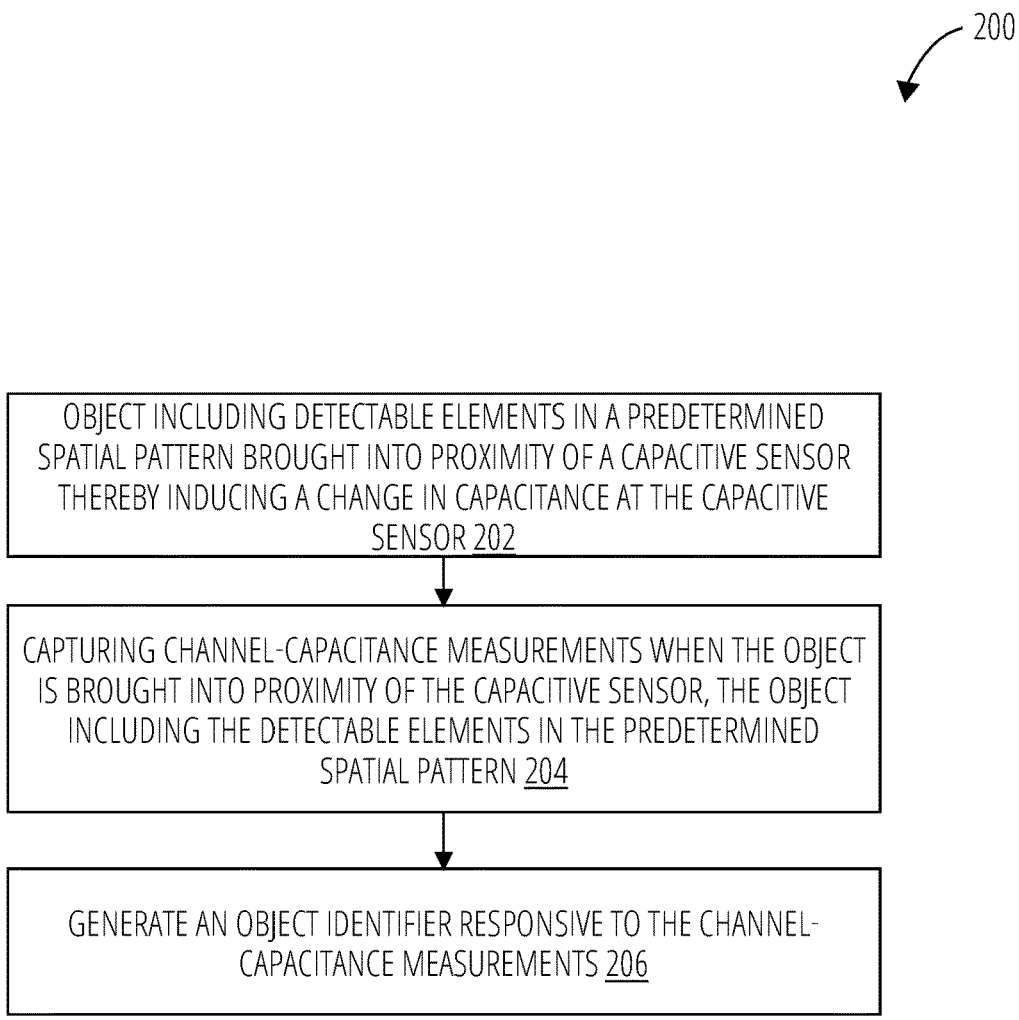
FIG. 2 illustrates a process in accordance with one or more embodiments.

FIG. 2 illustrates a process 200 for generating an object identifier 118 using an object-recognition system 114 in accordance with one or more embodiments. In some embodiments, one or more operations of process 200 may be performed by or using elements of system 100, such as object 106 and object-recognition system 114 of FIG. 1, without limitation.

At operation 202, an object including detectable elements in a predetermined spatial pattern is brought into proximity of a capacitive sensor. The object, and in particular detectable elements therein or thereon, in proximity of the capacitive sensor, induces a change in capacitance at the capacitive sensor. As a non-limiting example, referring to FIG. 1, object 106 is brought into proximity 112 of capacitive sensor 116. Capacitive sensor 116 generates a sensing signal indicative of the change in capacitance, which are indicative of proximity 112 and provides the sensing signal to controller 104 via connections 110.

At operation 204, channel-capacitance measurements associated with the capacitive sensor are captured e.g., at controller 104, without limitation.

At operation 206, an object identifier is generated at least partially responsive to the captured channel-capacitance measurements. As a non-limiting example, referring to FIG. 1, controller 104 generates object identifier 118 in response to the captured channel-capacitance measurements.

As discussed above, controller 104 may be configured to detect proximity of detectable elements 108 with capacitive sensor 116. In one or more embodiments, capacitive controller of controller 104 may be configured as a capacitive button type capacitive controller. Capacitive buttons are known to a person having ordinary skill in the art, and generally speaking, logically divide an area of capacitive sensor 116 into a number of capacitive buttons each associated with a number of sensor locations and, in the event of contact, indicate an activated button associated with the sensor locations of the contact.

Figure 3:
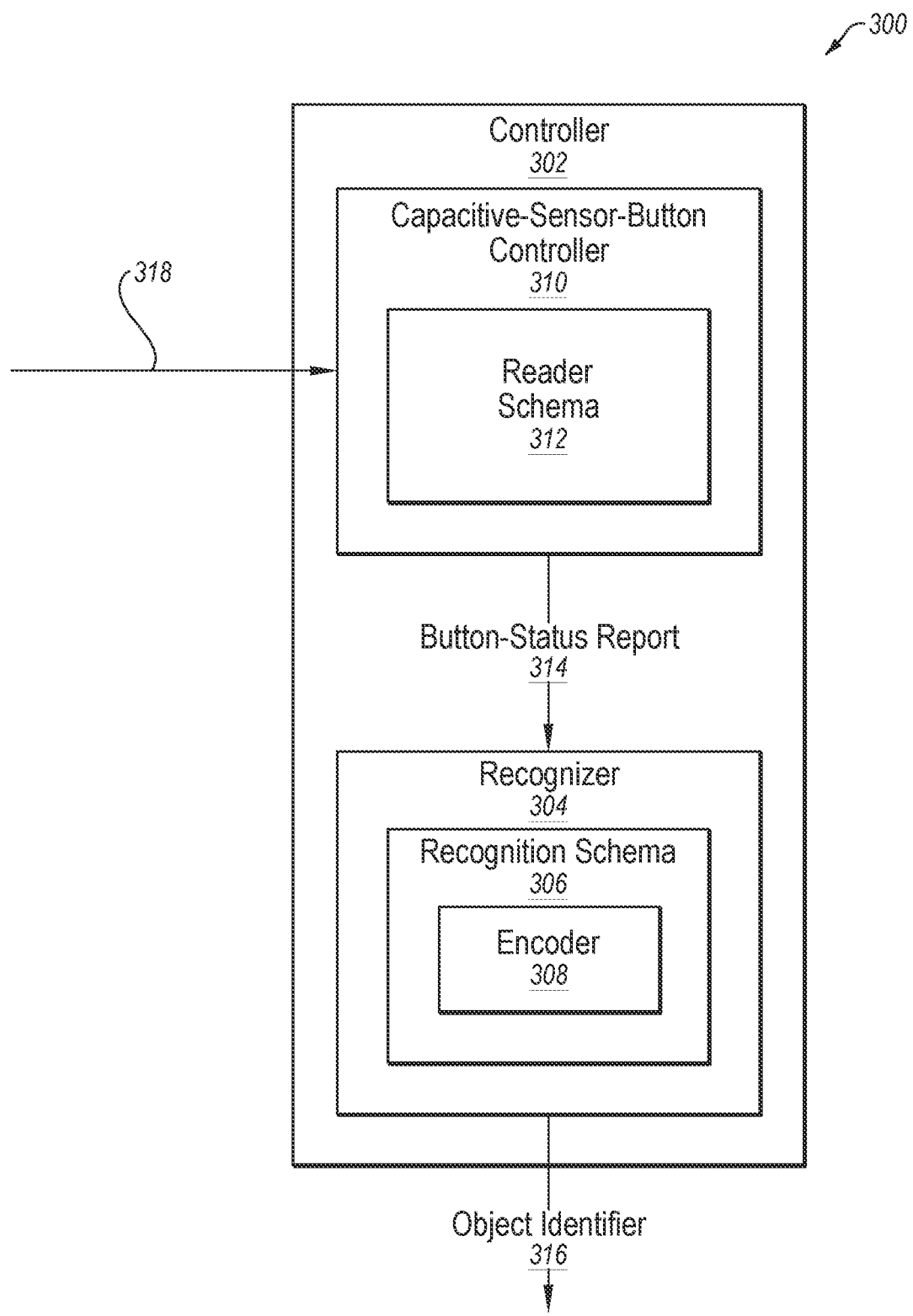
FIG. 3 illustrates an object-recognition system in accordance with one or more embodiments.

FIG. 3 illustrates object-recognition system 300 in accordance with one or more embodiments. Object-recognition system 300 includes controller 302. Controller 302 is a specific non-limiting example implementation of controller 104 of FIG. 1 according to one or more embodiments.

Controller 302 includes capacitive-sensor-button controller 310 including reader schema 312. Controller 302 also includes recognizer 304 including recognition schema 306, which includes encoder 308.

Capacitive-sensor-button controller 310 may be configured, generally, to generate a button-status report 314 in response to channel-capacitance measurements 318 received at object-recognition system 300. Each button-status report 314 may include sensor button indicators indicative of a state of respective specified areas of the capacitive sensor that correspond to capacitive sensor buttons. A sensor button indicator may be an activated-capacitive-sensor-button indicator that indicates that a capacitive button was activated, i.e., a detectable element 108 was detected within proximity of the capacitive button, or a sensor button indicator may be an unactivated-capacitive-sensor-button indicator that indicates that a capacitive button was not activated, i.e., a detectable element 108 was not detected within proximity of the capacitive button. A button-status report 314 may include sensor button indicators for a number of time periods corresponding to a number of reading cycles of a capacitive sensor by capacitive-sensor-button controller 310.

As a specific non-limiting example, button-status report 314 may include a sequence of binary digits where each bit position is associated with a sensor button and a specific bit value at a bit position represents a specific state of a given sensor button. As a non-limiting example, a bit value of a logic "1" in a first bit position indicates that a state of a corresponding sensor button is active, i.e., that a detectable element 108 was detected within proximity of the capacitive button, and a bit value of a logic "0" in the same first bit position indicates that a state of the corresponding sensor button is inactive, i.e., that a detectable element 108 was not detected within proximity of the capacitive button. Use of other conventions to represent buttons or button states in button-status report 314 does not exceed the scope of this disclosure.

Reader schema 312 may include correlation information describing associations between sensor locations of the capacitive sensor and capacitive buttons. In some embodiments, reader schema 312 may include correlation information defining an association between specified areas of a capacitive sensor and an order of capacitive sensor button indicators in button-status report 314. In some embodiments, reader schema 312 may include order information describing a specific order in which to traverse the specified areas to generate a sequence of capacitive sensor button indicators having a specific sequence that associates the button indicators with specific capacitive sensor buttons.

Recognizer 304 may be configured to receive button-status report 314 and generate object identifier 316 at least partially responsive to button-status report 314 and more specifically, the activated-capacitive-sensor-button indicators and unactivated capacitive sensor button indicators of button-status report 314.

Recognizer 304 may include recognition schema 306 that may include object correlation information defining an association between capacitive sensor button indicators and object identifiers. As a specific non-limiting example, object correlation information of recognition schema 306 may associate specific activated-capacitive-sensor-button indicators and unactivated capacitive sensor button indicators represented as a specific sequence of binary digits with a specific sequence of binary digits of object identifier 316. In a specific non-limiting example, recognition schema 306 may include instructions for generating object identifier 316 at least partially in response to the activated-capacitive-sensor-button indicators.

In the specific non-limiting example depicted by FIG. 3, recognition schema 306 includes an optional encoder 308, e.g., a button-traversal schema, which includes order information defining a specific order in which the capacitive sensor button indicators of button-status report 314 are to be traversed when generating object identifier 316. As a specific non-limiting example, the activated-capacitive-sensor-button indicators may be traversed fourth, second, third, then first, without limitation. Applying optional encoder 308 may provide an additional layer of security by obscuring correspondence between object identifier 316, button-status report 314, and capacitive sensor button layout. Optional encoder 308 is operative so that object identifier 316 is encoded (i.e., is expressed as a code).

In the manner described above, a capacitive-sensor button may perform binary detection (i.e., contact detected or contact not detected) and generate an object identifier 316 in response to such binary detection.

Figure 4:
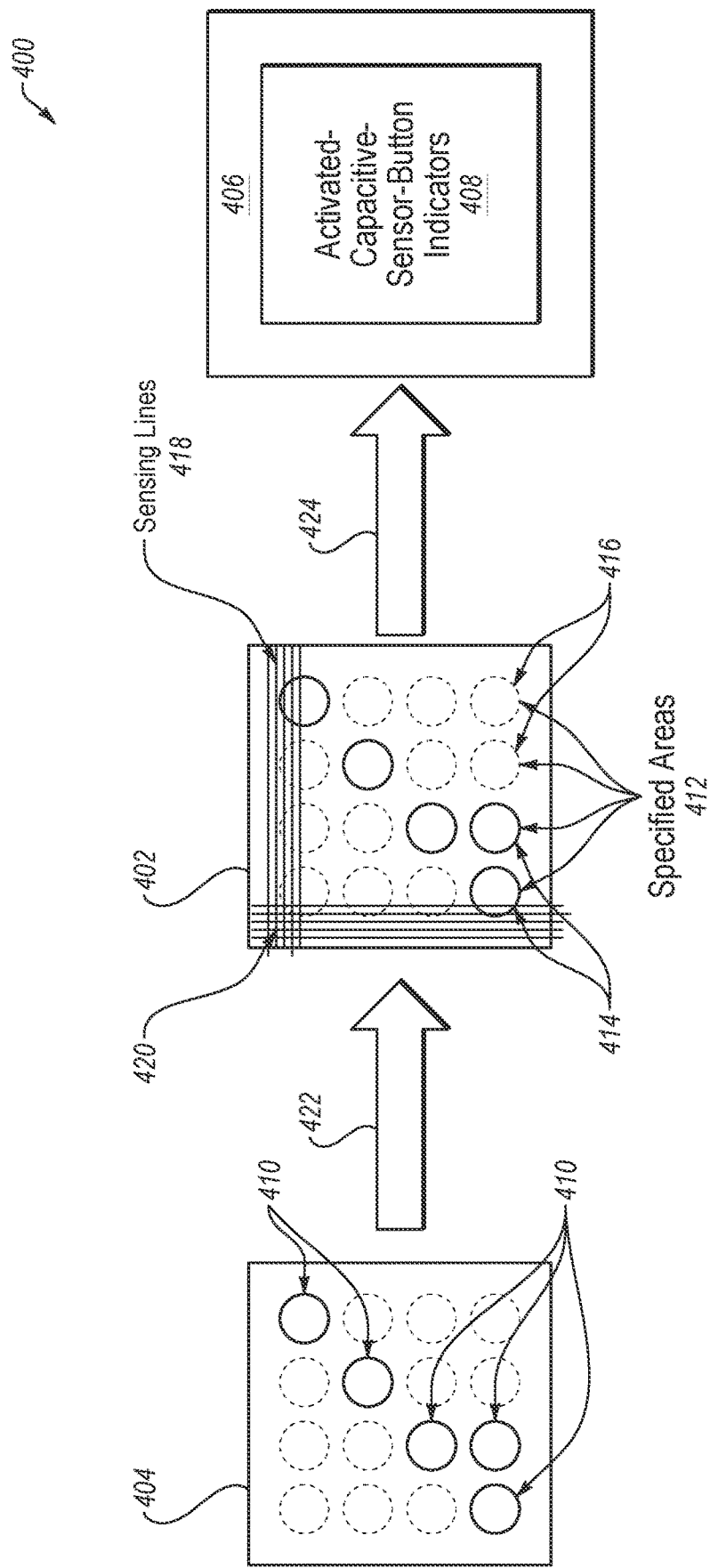
FIG. 4 illustrates a process to aid in explaining or more embodiments.

FIG. 4 is a schematic diagram depicting a specific non-limiting example process 400 that illustrates correspondence of detectable elements, capacitive buttons, and capacitive button indicators discussed herein.

As depicted by FIG. 4, process 400 involves detectable elements 410 of an object portion 404 in proximity 422 of sensor locations 420 of capacitive sensor portion 402 that are logically associated with capacitive sensor buttons (e.g., by capacitive-sensor-button controller 310). In the specific non-limiting example, during proximity 422 detectable elements 410 are overlaid capacitive sensor portion 402 in the same pattern depicted.

Object portion 404 includes detectable elements 410 illustrated using solid-line circles and arranged in object portion 404 in accordance with a particular predetermined spatial pattern. Notably, object portion 404 also includes locations without detectable elements, which, for convenience, are illustrated using dashed-line circles but are not labeled.

Capacitive sensor portion 402 includes specified areas 412 corresponding to capacitive sensor buttons. Capacitive sensor buttons may or may not be visually demarcated at capacitive sensor portion 402. Specified areas 412 may correspond to one or more (e.g., a group of) sensor locations 420 of capacitive sensor portion 402. As a non-limiting example, capacitive sensor portion 402 may include a grid of intersecting sensing lines 418 that extends over an entire area of capacitive sensor portion 402. Sensor locations 420 may be defined by the intersections of the sensor lines. To avoid unnecessarily obscuring other elements depicted by FIG. 4, only some sensing lines 418 are illustrated.

Upon proximity 422 of object portion 404 and capacitive sensor portion 402, and more specifically, upon proximity 422 of detectable elements 410 with some of the specified areas 412 of capacitive sensor portion 402, one or more capacitive sensor buttons are activated, i.e., the activated-capacitive-sensor-button indicators 408 are generated. Upon update 424, activated-capacitive-sensor-button indicators 408 corresponding to activated sensor buttons 414 (and optionally unactivated capacitive sensor button indicators corresponding to unactivated sensor buttons 416) are added to button-status report portion 406.

As discussed, FIG. 4 illustrates a correspondence between detectable elements 410 and activated sensor buttons 414, and further illustrates a correspondence between activated sensor buttons 414 and activated-capacitive-sensor-button indicators 408 of button-status report portion 406. As a non-limiting example, for each of activated sensor buttons 414, one of activated-capacitive-sensor-button indicators 408 is included in button-status report portion 406. Update 424 for inclusion of activated-capacitive-sensor-button indicators 408 in button-status report portion 406 may be performed according to a reader schema (e.g., reader schema 312 of FIG. 3). As a specific non-limiting example, a reader schema may indicate an order in which the specified areas 412 are to be traversed when generating activated-capacitive-sensor-button indicators 408 for inclusion in button-status report portion 406. As a specific non-limiting example, specified areas 412 may be traversed left-to-right and top-to-bottom according to the reader schema, which, in the case illustrated in FIG. 4, may result in button-status report portion 406 including activated-capacitive-sensor-button indicators 408 "0001 0010 0100 1100." Alternatively, specified areas 412 may be traversed in any order. As an alternative non-limiting example, the reader schema may indicate a number representing each of specified areas 412, where the number of the activated specified areas is to be included in button-status report portion 406. Which, in the case illustrated in FIG. 4, may result in button-status report portion 406 including activated-capacitive-sensor-button indicators 408: "4," "7," "10," "13," and "14," for the example layout of 16 separate specified areas 412.

As discussed, an object identifier (e.g., object identifier 118, without limitation) may be generated based on activated-capacitive-sensor-button indicators 408 in button-status report portion 406. As a specific non-limiting example, a recognizer (e.g., recognizer 304) may encode the specified areas in proximity of detectable elements 410 (as indicated by activated sensor buttons 414 and by activated-capacitive-sensor-button indicators 408) as a number in any suitable format. As a non-limiting example, in some embodiments, the object identifier may be the same as the binary number as read from activated-capacitive-sensor-button indicators 408. As another specific non-limiting example, the object identifier may be a binary number based on numbers indicative of specified areas contacted. In other embodiments, a traversal schema (e.g., according to encoder 308 of FIG. 3) may indicate another order in which to traverse activated-capacitive-sensor-button indicators 408 to generate the object identifier.

In some embodiments, one or more of activated-capacitive-sensor-button indicators 408 may be omitted when traversing activated-capacitive-sensor-button indicators 408 to generate the object identifier. As a specific non-limiting example, corner activated-capacitive-sensor-button indicators 408 based on corner specified areas 412 may be omitted when traversing activated-capacitive-sensor-button indicators 408 to generate the object identifier. As a non-limiting example, in the case illustrated, an object identifier based on activated-capacitive-sensor-button indicators 408 "0001 0010 0100 1100" may be then reduced to "0010 1001 0010." In some embodiments, the corner specified areas 412 may be utilized to identify the orientation of object portion 404, as described further below.

Figure 5:
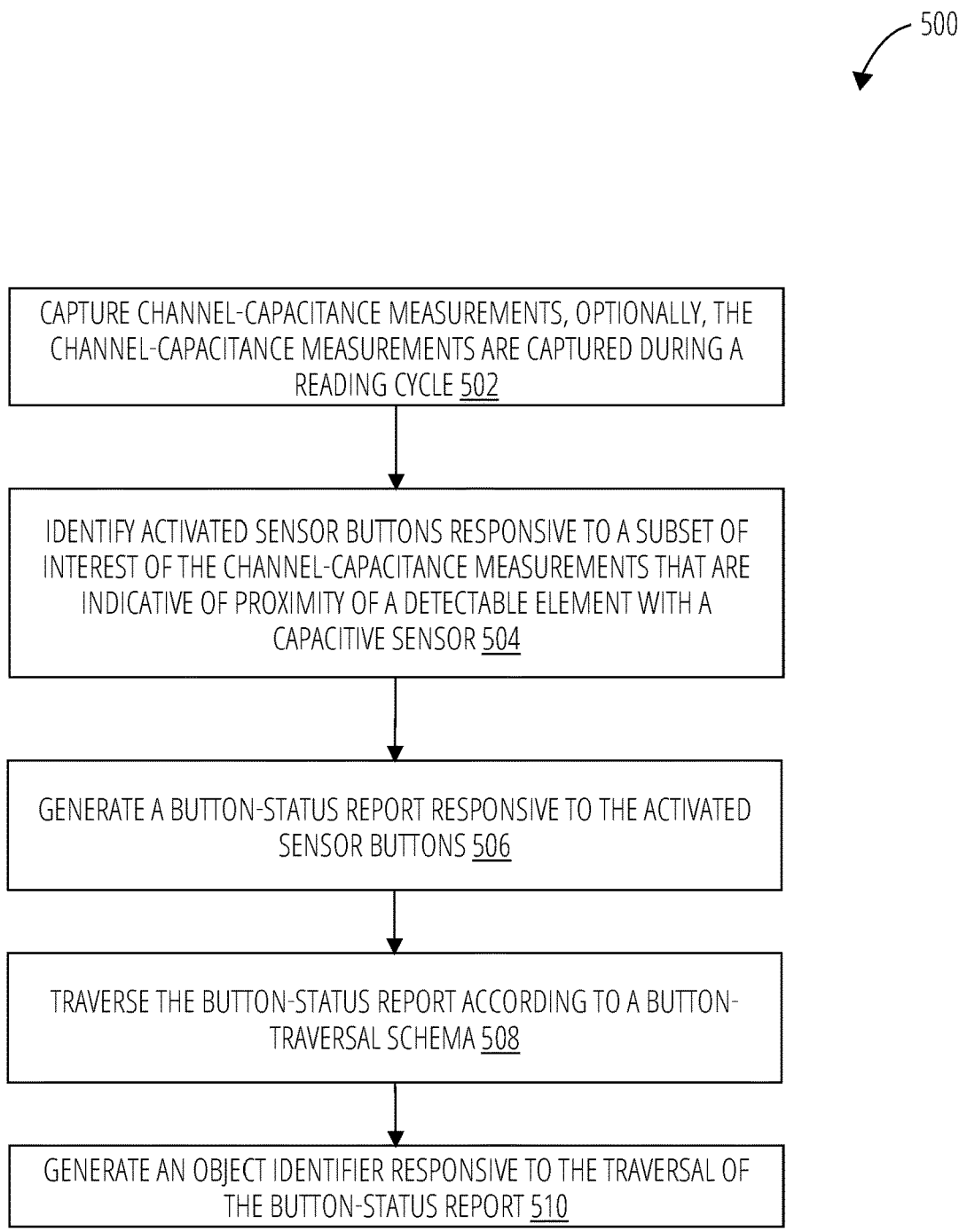
FIG. 5 illustrates a process in accordance with one or more embodiments.

FIG. 5 illustrates process 500 in accordance with one or more embodiments. In some embodiments, one or more operations of process 500 may be performed by object-recognition system 300 of FIG. 3.

At operation 502, channel-capacitance measurements are captured. Optionally, channel-capacitance measurements are captured during a time period corresponding to a reading cycle by a capacitive-sensor-button controller. As a non-limiting example, referring to FIG. 3, capacitive-sensor-button controller 310 may be configured to capture the channel-capacitance measurements of channel-capacitance measurements 318.

At operation 504, activated sensor buttons are identified at least partially in response to a subset of interest of the channel-capacitance measurements. The subset of interest of the channel-capacitance measurements is indicative of proximity of a detectable element with a capacitive sensor. As a non-limiting example, referring to FIG. 3 and FIG. 4, the channel-capacitance measurements include channel-capacitance measurements from all sensor locations 420 of capacitive sensor portion 402 included in channel-capacitance measurements 318. The subset of interest of the channel-capacitance measurements includes channel-capacitance measurements related to activated sensor buttons 414.

At operation 506, a button-status report is generated at least partially in response to the activated sensor buttons. As a non-limiting example, referring to FIG. 3, capacitive-sensor-button controller 310 generates button-status report 314 at least partially in response to channel-capacitance measurements 318. As a non-limiting example, referring to FIG. 4, button-status report portion 406 includes activated-capacitive-sensor-button indicators 408, which are indicative of activated sensor buttons 414.

At operation 508, the button-status report is traversed according to a button-traversal schema. As a non-limiting example, referring to FIG. 3, recognizer 304 may be configured to traverse button-status report 314 according to encoder 308.

At operation 510, an object identifier is generated at least partially in response to the traversal of the button-status report. As a non-limiting example, referring to FIG. 3, the recognizer 304 may be configured to encode object identifier 316 at least partially in response to the traversal of button-status report 314 according to encoder 308.

In some cases, it may be desirable for an object recognition system to account for orientation of an object having detectable elements relative to a capacitive sensor during contact. A same object identifier may be generated whatever the orientation of the object relative to the capacitive sensor.

Figure 6:
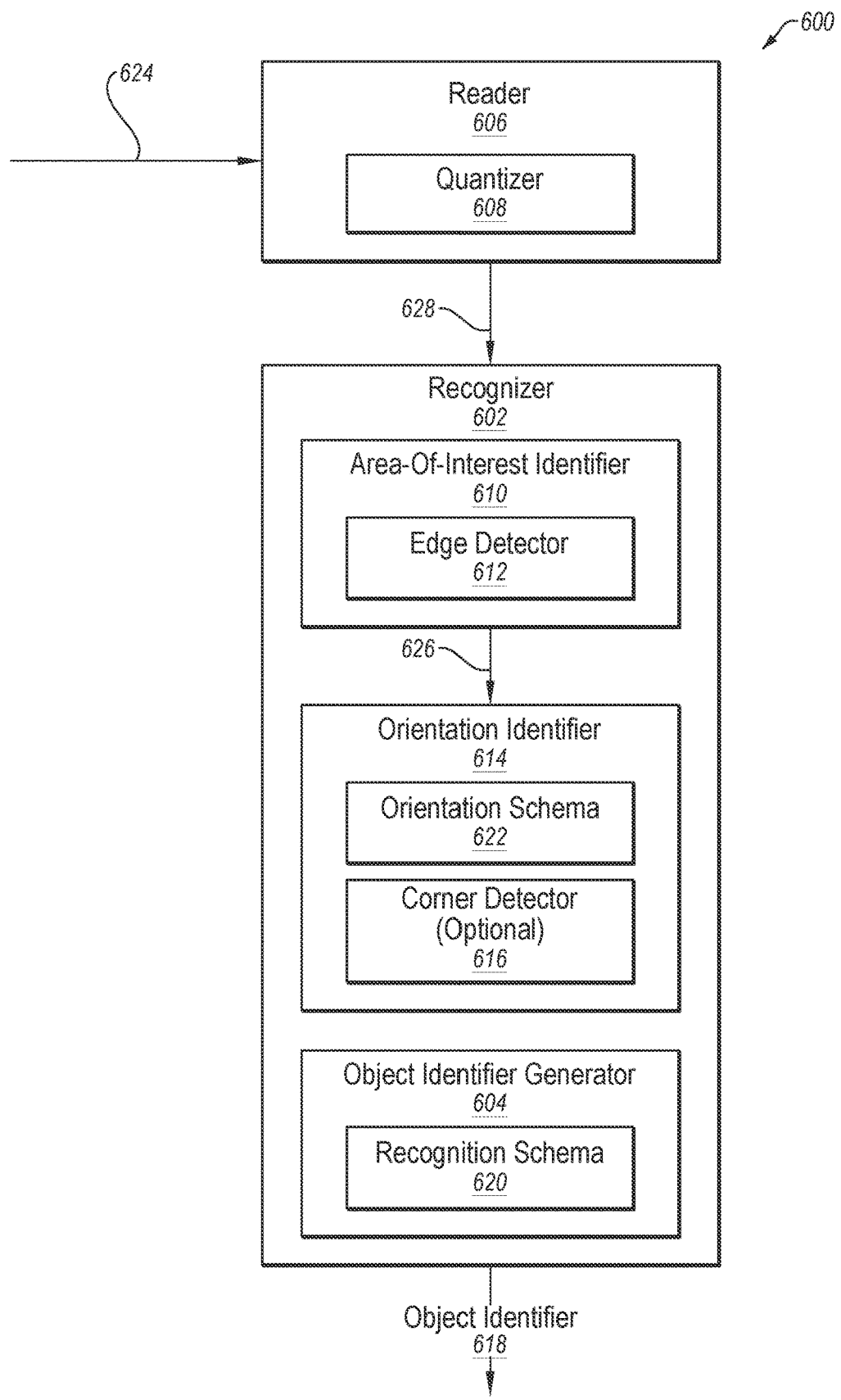
FIG. 6 illustrates a controller in accordance with one or more embodiments.

FIG. 6 is a block diagram depicting a controller 600 configured to discern an orientation of an object relative to a capacitive sensor, in accordance with one or more embodiments. Controller 600 may be an example implementation of controller 104 of FIG. 1 according to one or more embodiments. Controller 600 includes reader 606 and recognizer 602.

Reader 606 may be configured to generate quantized channel-capacitance measurements 628 in response to capacitive-sensor signal 624 received from a capacitive sensor, such as capacitive sensor 116. Reader 606 may include quantizer 608 configured to generate the quantized channel-capacitance measurements 628 in response to capacitive-sensor signal 624. As a non-limiting example, reader 606 may receive capacitive-sensor signal 624, and quantize channel-capacitance measurements of capacitive-sensor signal 624 at quantizer 608 to generate quantized channel-capacitance measurements 628. In some embodiments, quantizer 608 may be configured to quantize the channel-capacitance measurements of capacitive-sensor signal 624 according to three or more quantization levels.

Recognizer 602 may be configured, generally, to generate object identifier 618 in response to quantized channel-capacitance measurements 628 generated by reader 606. Recognizer 602 includes area-of-interest identifier 610, orientation identifier 614, and object identifier generator 604.

Area-of-interest identifier 610 may be configured to identify an area of interest of a capacitive sensor. Such an area of interest may include one or more sensor locations of the capacitive sensor as represented by quantized channel-capacitance measurements 628 of capacitive-sensor signal 624. In other words, an area of interest may be indicative of a subset of the quantized channel-capacitance measurements of capacitive-sensor signal 624 that are from a number of sensor locations of the capacitive sensor. An area of interest may correspond to sensor locations for which detectable elements of an object are in proximity of the capacitive sensor.

As a non-limiting example, a capacitive sensor may be larger than an object that is in contact with the capacitive sensor. All of the sensor locations of the capacitive sensor may generate quantized channel-capacitance measurements 628, and some of the quantized channel-capacitance measurements 628 may indicate no detectable element in proximity thereof. The area of interest may be indicative of the quantized channel-capacitance measurements 628 that correspond to the object location, e.g., excluding quantized channel-capacitance measurements 628 that are not related to the object location. The area of interest may include quantized channel-capacitance measurements 628 that indicate proximity (e.g., based on detectable elements in the object) and the area of interest may also include quantized channel-capacitance measurements 628 that indicate no proximity (e.g., based on absences of detectable elements in sensor locations that are associated (e.g., underneath) with the object).

Area-of-interest identifier 610 may include edge detector 612, which may be configured to identify edges that define an area of interest. As a non-limiting example, to identify an area of interest, area-of-interest identifier 610 may be configured to use edge detector 612 to identify edges that define an area of interest. Edge detector 612 may be configured to detect edges in quantized channel-capacitance measurements 628 according to any suitable edge-detection algorithm known to a person having ordinary skill in the art, including search based and zero-crossing based algorithms, without limitation.

Orientation identifier 614 may be configured to identify a spatial relationship between an area of interest and a capacitive sensor in response to a subset of quantized channel-capacitance measurements 626 corresponding to the area of interest identified by area-of-interest identifier 610. Such a spatial relationship may be indicative of a spatial relationship between an object in contact with the capacitive sensor and the capacitive sensor. The spatial relationship may include a positional relationship, e.g., a distance between the area of interest and a center or corner of the capacitive sensor. Additionally, or alternatively, the spatial relationship may include a rotational relationship, which may indicate e.g., a number of degrees of rotation between a grid of the object and a grid of the capacitive sensor. As used herein, the term "orientation information" includes a spatial relationship, which may include one or both of the positional relationship and the rotational relationship.

In some embodiments, in order to identify a spatial relationship, orientation identifier 614 may be configured to compare the subset of quantized channel-capacitance measurements 626 to data points of an orientation schema 622. As a non-limiting example, orientation identifier 614 may be configured to identify three channel-capacitance measurements and compare the identified three channel-capacitance measurements to data points of the orientation schema 622. As a specific non-limiting example, orientation identifier 614 may be configured to identify three channel-capacitance measurements in a particular arrangement and identify a corresponding arrangement of data points in the orientation schema 622. Orientation identifier 614 may be configured to identify the spatial relationship based on the correspondence between the particular arrangement in the subset of quantized channel-capacitance measurements 626 and the corresponding arrangement of data points in the orientation schema 622.

In some embodiments, orientation identifier 614 may include an optional corner detector 616, which may be configured to identify corners of the area of interest. In some embodiments, corner detector 616 may be configured to operate with edge detector 612, as a non-limiting example, corner detector 616 may be configured to identify corners based on identified edges. In other embodiments, corner detector 616 may identify corners according to any suitable edge and/or corner detection algorithm. The corners of the area of interest may be compared to data points in the orientation schema 622 to identify the spatial relationship. As a specific non-limiting example, three corners of a quadrilateral of the area of interest may be identified in the subset of quantized channel-capacitance measurements 626. The three corners may be compared with and correlated with three corresponding corners of a quadrilateral in the orientation schema 622. Based on the correlation between the three corners in the subset of quantized channel-capacitance measurements 626 and the data points in the orientation schema 622, the spatial relationship may be identified. Additional details regarding this example are given with reference to FIG. 10.

Recognizer 602 may include an optional object identifier generator 604, which may be configured to generate object identifier 618 in response to the subset of quantized channel-capacitance measurements 626. In some embodiments, object identifier generator 604 may be configured to generate object identifier 618 based on the subset of quantized channel-capacitance measurements 626, i.e., those corresponding to the area of interest. In some embodiments, object identifier generator 604 may be configured to generate object identifier 618 in response to a spatial relationship determined by orientation identifier 614.

In some embodiments, object identifier generator 604 may be configured to generate object identifier 618 based on a correspondence between the quantized channel-capacitance measurements 628 (and in some cases, the subset of quantized channel-capacitance measurements 626) and data points of recognition schema 620. As a non-limiting example, recognition schema 620 may include an object-recognition dictionary including arrangements of quantized channel-capacitance measurements 628 and corresponding object identifiers. Object identifier generator 604 may be configured to generate object identifier 618 as an object identifier of the object-recognition dictionary based on a correspondence between the quantized channel-capacitance measurements 628, or subset of quantized channel-capacitance measurements 626, and a set of channel-capacitance measurements in the object-recognition dictionary that corresponds to the object identifier.

In some embodiments, object identifier generator 604 may be configured to generate object identifier 618 based on encoding sensor locations (or groups of sensor locations) of the quantized channel-capacitance measurements 628 or subset of quantized channel-capacitance measurements 626, as points of data (e.g., bits). As a non-limiting example, sensor locations (or groups of sensor locations) in the area of interest may be identified and traversed according to recognition schema 620. As the sensor locations (or groups of sensor locations) are traversed, a numerical value may be generated at least partially in response to the quantized channel-capacitance measurements 628 of each sensor location (or each group of sensor locations). As a non-limiting example, the area of interest may be divided into an m*n grid of groups of sensor locations. The m*n grid of groups of sensor locations may be traversed in an order according to recognition schema 620. For each group of sensor locations, a numerical value indicative of quantized channel-capacitance measurements of the group may be generated for inclusion in object identifier 618. As discussed above, the quantized channel-capacitance measurements 628 may have been quantized by quantizer 608 according to three or more quantization levels. Accordingly, as the quantized channel-capacitance measurements 628 are encoded, each of quantized channel-capacitance measurements 628 may be encoded into one of three or more numerical values.

Figure 7:
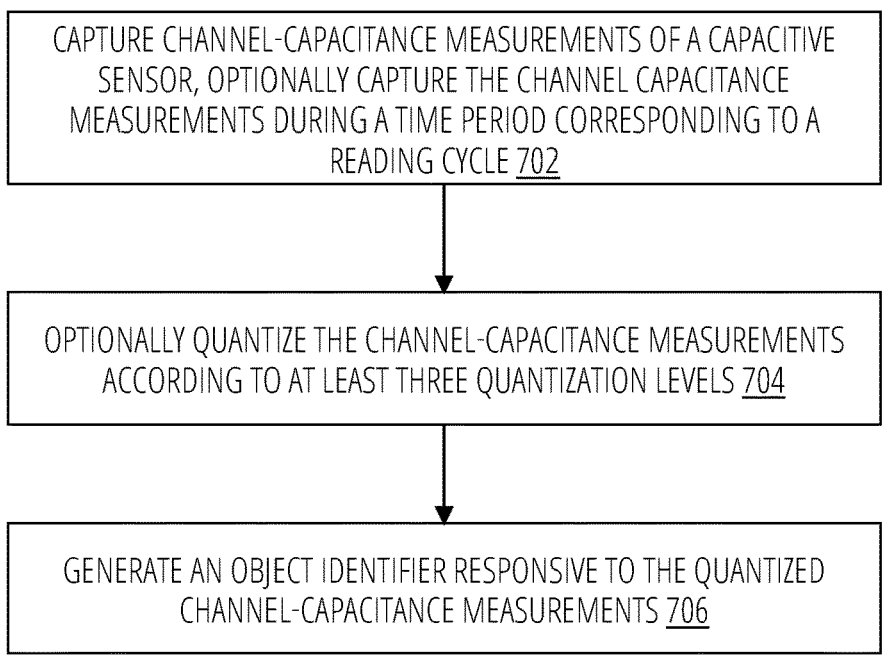
FIG. 7 illustrates a process in accordance with one or more embodiments.

FIG. 7 illustrates process 700 in accordance with one or more embodiments. In some embodiments, one or more operations of process 700 may be performed by or using elements of controller 600 of FIG. 6.

At operation 702, channel-capacitance measurements of a capacitive sensor are captured. Optionally, the channel-capacitance measurements are captured during a time period corresponding to a reading cycle. As a non-limiting example, referring to FIG. 6, reader 606 may be configured to capture the channel-capacitance measurements of capacitive-sensor signal 624.

At operation 704, the channel-capacitance measurements are optionally quantized. In some embodiments, the channel-capacitance measurements are quantized according to at least three quantization levels. As a non-limiting example, referring to FIG. 6, the channel-capacitance measurements of capacitive-sensor signal 624 are quantized at quantizer 608. Thereafter, quantized channel-capacitance measurements 628 are provided by reader 606 e.g., to recognizer 602.

At operation 706, an object identifier is generated at least partially in response to the channel-capacitance measurements. As a non-limiting example, referring to FIG. 6, recognizer 602 may be configured to generate object identifier 618 at least partially in response to the channel-capacitance measurements (e.g., quantized channel-capacitance measurements 628).

Figure 8:
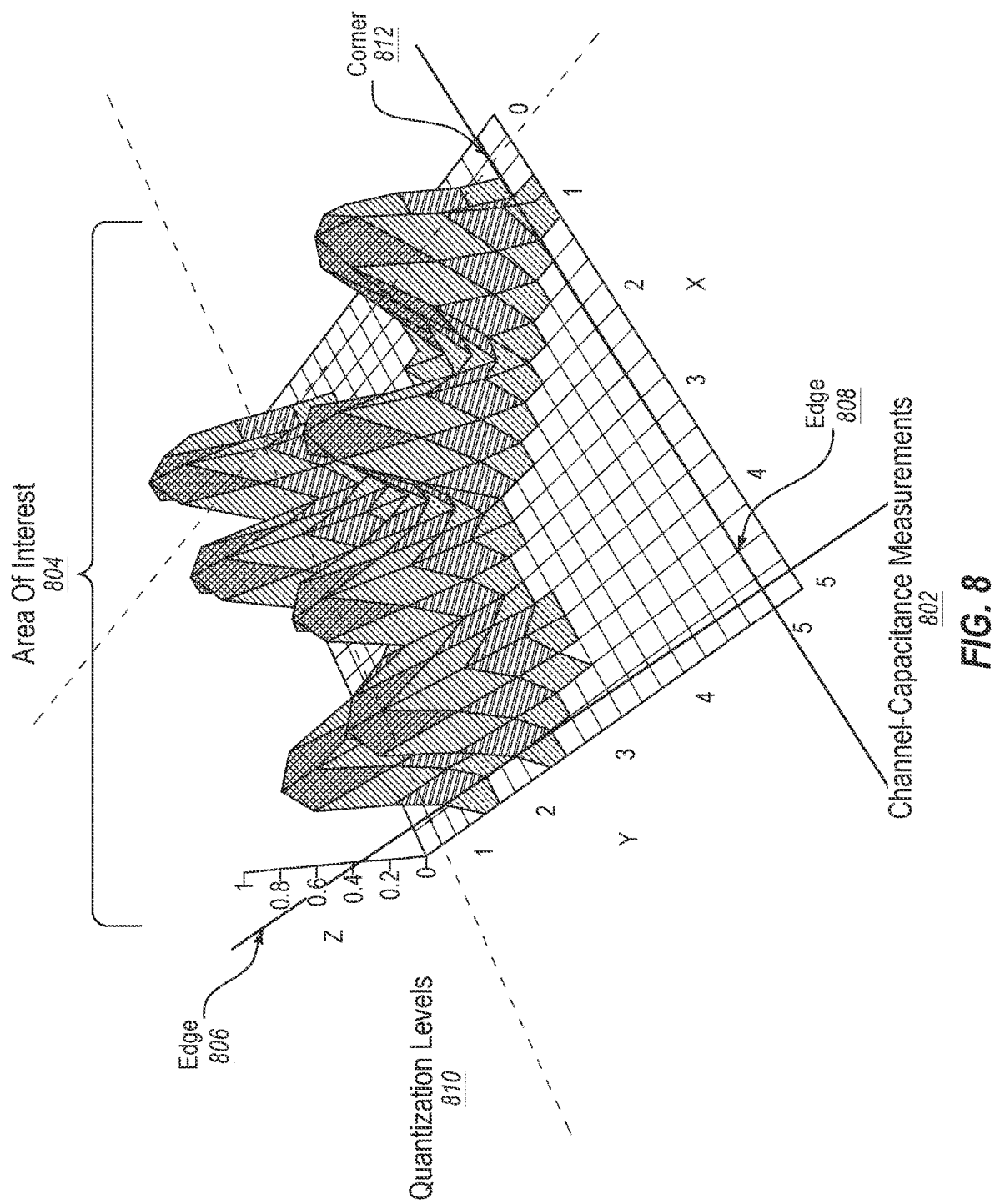
FIG. 8 illustrates a topographical map to aid in explaining one or more embodiments.

FIG. 8 is a diagram depicting a topographical map 800 to illustrate a specific non-limiting example of quantization levels of channel-capacitance measurements 802 for an area of interest 804.

FIG. 8 illustrates a visual representation of channel-capacitance measurements 802. Channel-capacitance measurements may include data captured from a capacitive sensor indicative of channel capacitance at sensor locations (e.g., intersections of sensing lines) of the capacitive sensor. Channel-capacitance measurements 802 illustrate channel-capacitance measurements as heights in a three-dimensional graph with height representing normalized channel-capacitance values. FIG. 8 illustrates channel-capacitance measurements 802 according to an x-y grid that may correspond to x and y sensing lines of a capacitive sensor. FIG. 8 illustrates the values of channel-capacitance measurements 802 as quantized values e.g., the measured channel-capacitance values have been quantized into several (e.g., six) quantization levels 810.

Additionally, FIG. 8 illustrates area of interest 804 of channel-capacitance measurements 802. Area of interest 804 may include a subset of all of the channel-capacitance measurements of the capacitive sensor. Area of interest 804 may be defined by edge, e.g., edge 806 and edge 808. Additionally, area of interest 804 may have corners, e.g., corner 812.

Figure 9:
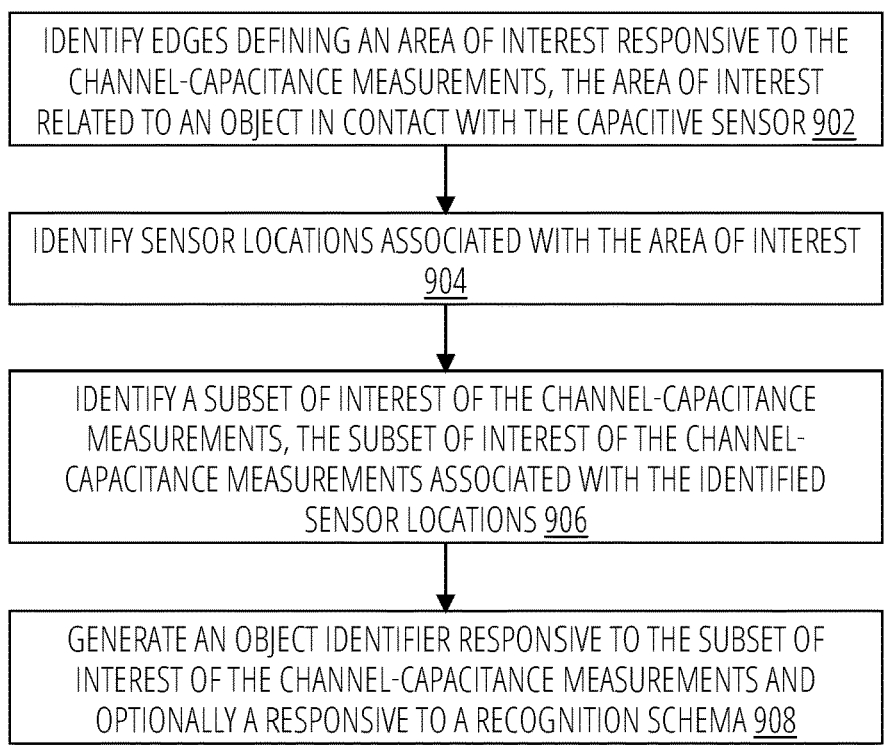
FIG. 9 illustrates a process in accordance with one or more embodiments.

FIG. 9 illustrates process 900 for generating an object identifier at least partially in response to channel-capacitance measurements, in accordance with one or more embodiments. In some embodiments, one or more operations of process 900 may be performed by or using elements of controller 600 of FIG. 6. In some embodiments, process 900 may be included in process 700 e.g., between operation 702 and operation 706.

At operation 902, edges defining an area of interest are identified at least partially in response to channel-capacitance measurements. The area of interest is related to an object that is in proximity of a capacitive sensor, in particular to one or more detectable elements of the object. The channel-capacitance measurements are the channel-capacitance measurements captured at operation 702. As a non-limiting example, referring to FIG. 6, edge detector 612 may be configured to identify the edges defining an area of interest. Additionally, area-of-interest identifier 610 may be configured to identify the area of interest based on the identified edges.

At, operation 904, sensor locations associated with the area of interest are identified. The sensor locations are a subset of interest of all of the sensor locations of the capacitive sensor.

At operation 906, a subset of interest of channel-capacitance measurements is identified. The subset of interest of the channel-capacitance measurements is associated with the identified sensor locations of operation 904. As such, the subset of interest of the channel-capacitance measurements is related to the object.

At operation 908, an object identifier is generated at least partially in response to the subset of interest of the channel-capacitance measurements. Optionally, the object identifier is generated at least partially in response to the subset of interest of channel-capacitance measurements and a recognition schema. As a non-limiting example, referring to FIG. 6, object identifier generator 604 may be configured to generate object identifier 618 at least partially in response to the subset of interest of channel-capacitance measurements (e.g., the subset of quantized channel-capacitance measurements 626 that are associated with the object rather than all of the quantized channel-capacitance measurements 628 of the capacitive sensor) and, in some cases, recognition schema 620.

Figure 10:
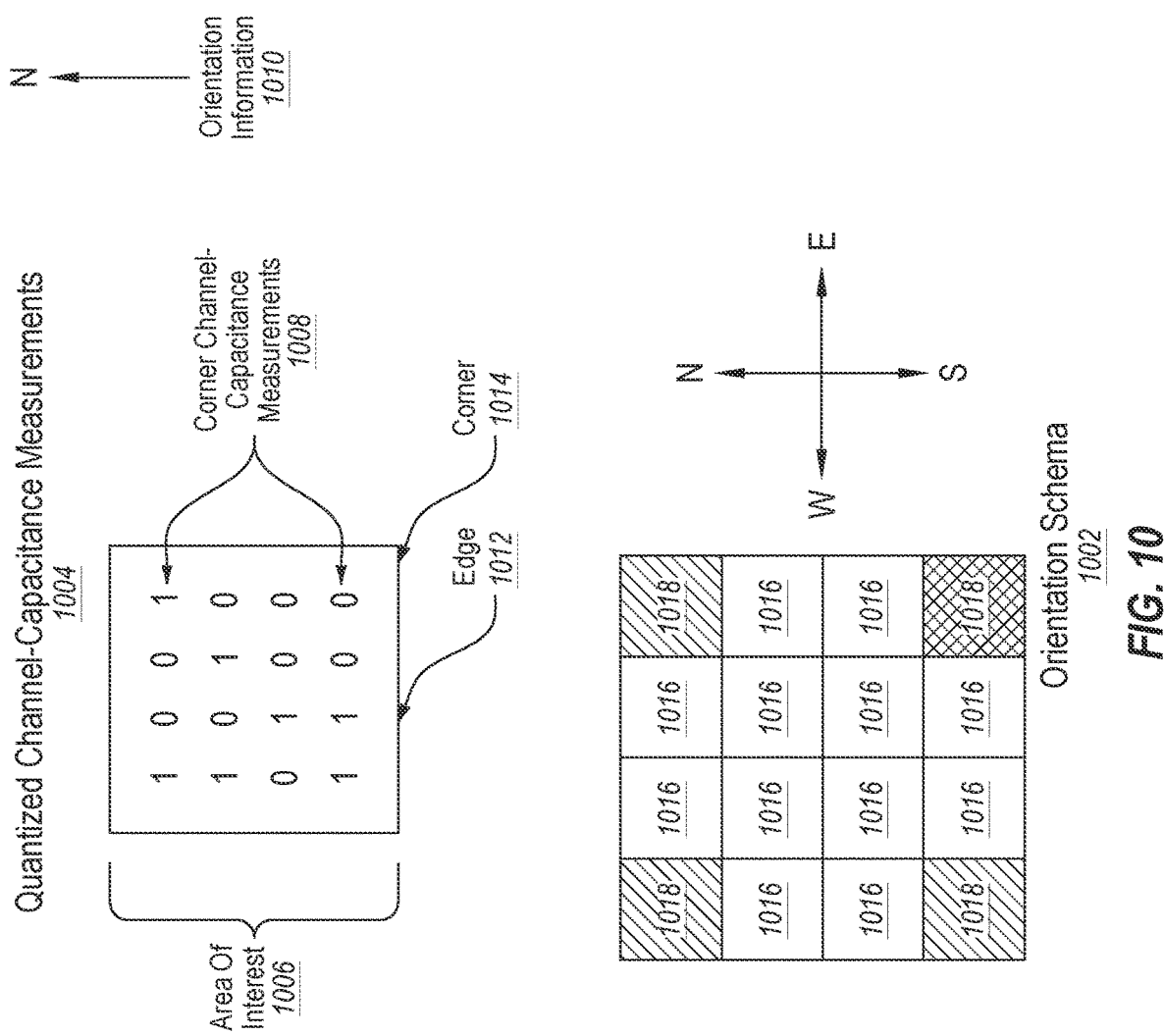
FIG. 10 illustrates concepts to aid in explaining or more embodiments.

FIG. 10 is a diagram that illustrates concepts discussed herein for determining orientation in accordance with one or more embodiments.

FIG. 10 illustrates quantized channel-capacitance measurements 1004 represented as discrete values '1' or '0.' Quantized channel-capacitance measurements 1004 may include channel-capacitance measurements for area of interest 1006. Area of interest 1006 may be defined by edges e.g., edge 1012. Area of interest 1006 may have corners, e.g., corner 1014.

In some embodiments, quantized channel-capacitance measurements 1004 may have been spatially aggregated from a larger number of data points (e.g., a larger number of measurements of the subset of interest of the channel-capacitance measurements). As a non-limiting example, channel-capacitance measurements 802 of FIG. 8 may be spatially aggregated to arrive at quantized channel-capacitance measurements 1004. Additionally, quantized channel-capacitance measurements 1004 may have been additionally quantized e.g., channel-capacitance measurements 802 of FIG. 8 may be further quantized to arrive at quantized channel-capacitance measurements 1004.

FIG. 10 illustrates orientation schema 1002, and a pattern of data points 1016. In this case, corner data points 1018 of orientation schema 1002 may be identified for use in orientating quantized channel-capacitance measurements 1004. Based on the identification of corner data points 1018 for use in orientation, corner channel-capacitance measurements 1008 of quantized channel-capacitance measurements 1004 may be identified. Expected values of corner data points 1018 may be compared with values of corner channel-capacitance measurements 1008. If the values of corner channel-capacitance measurements 1008 match expected values of corner data points 1018, orientation information 1010, including a rotational orientation of quantized channel-capacitance measurements 1004, may be determined. As a non-limiting example, a "north" of quantized channel-capacitance measurements 1004 may be identified. Additionally, or alternatively, a degree rotation between the object and the capacitive sensor may be identified. If the values of corner channel-capacitance measurements 1008 do not match the expected values of corner data points 1018, one of quantized channel-capacitance measurements 1004 or orientation schema 1002 may be rotated and another comparison may be performed, with the degree of rotation stored in order to determine orientation.

In this way, a rotational orientation of the object (and/or the channel-capacitance measurements that result from proximity between the detectable elements of the object and the capacitive sensor) relative to the capacitive sensor may be identified. The rotational orientation may be important to the generation of the object identifier because, as a non-limiting example, when traversing the channel-capacitance measurements according to a recognition schema, it may be important that the channel-capacitance measurements are oriented at the same rotational angle as the recognition schema.

In some cases there may be an expectation that objects that are to be recognized include detectable elements (and/or not include detectable elements) in locations corresponding to data points in orientation schema 1002 that have been identified for orientation. As a non-limiting example, objects that are to be recognized according to a recognition schema including orientation schema 1002 may include detectable elements in three corners of a quadrilateral and exclude detectable elements in a fourth corner.

One benefit of selecting three external corners of orientation schema 1002 for orientation of quantized channel-capacitance measurements 1004 is that in selecting three external corners for orientation, objects to be recognized will include detectable elements in three external corners. Including detectable elements in three external corners (e.g., of a quadrilateral) may allow for simpler area-of-interest identification because the area of interest may be guaranteed to include three detectable elements at three corners (of the quadrilateral) and the area of interest identifier can expect to identify edges or corners based on detectable elements in the corners.

Data points 1016 allow for placement of a number of potential predetermined spatial patterns of detectable elements. In non-limiting example shown in FIG. 10, 12 data points 1016 are provided, which provide for up to 4096 different particular predetermined spatial patterns of detectable elements.

Other patterns of orientation schema have been conceived by inventors and are within the scope of this disclosure. As a specific non-limiting example, three of four central data points of data points 1016 may be identified for orientation, instead of corner data points 1018.

Figure 11:
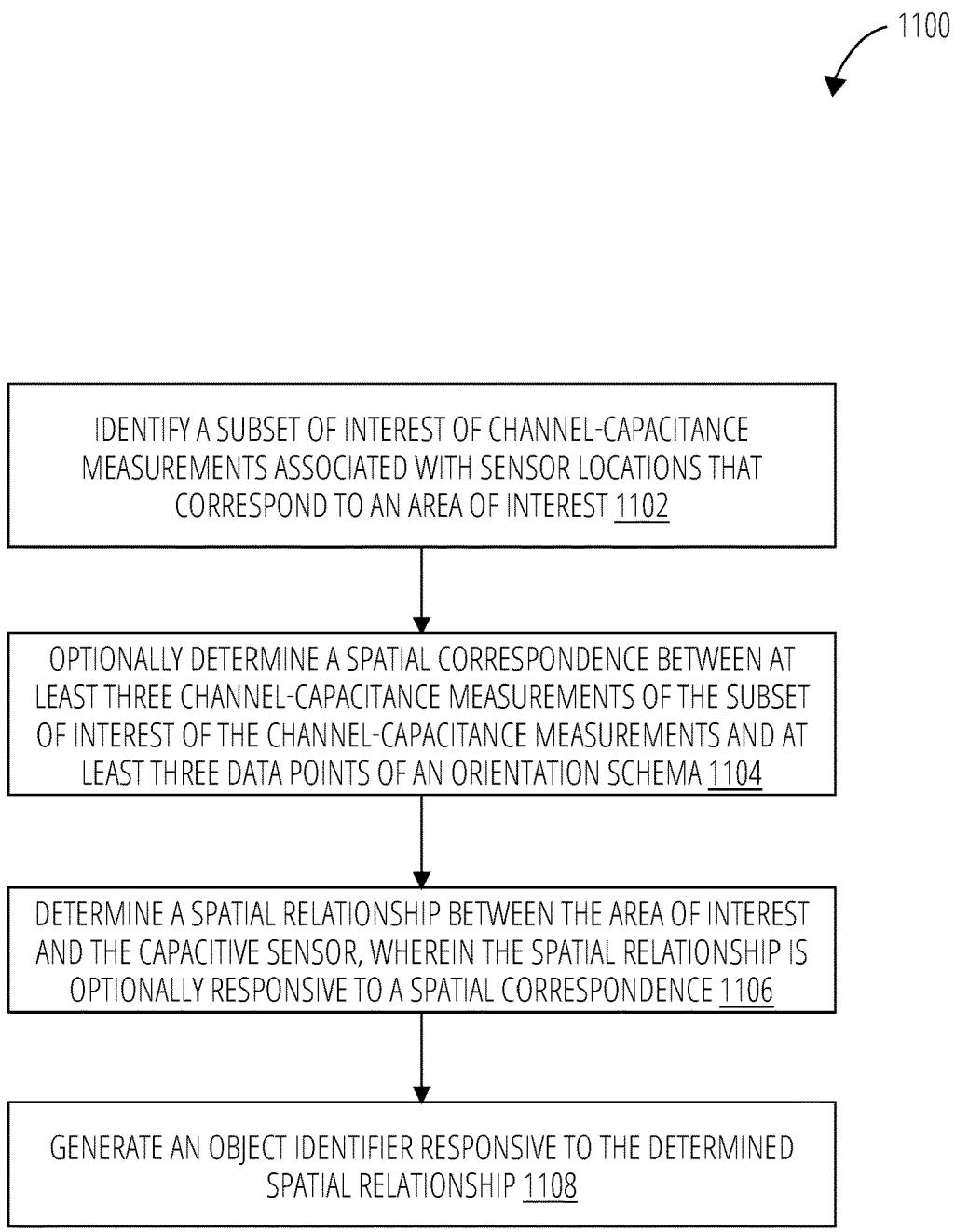
FIG. 11 illustrates a process in accordance with one or more embodiments.

FIG. 11 illustrates process 1100 in accordance with one or more embodiments. In some embodiments, one or more operations of process 1100 may be performed by or using elements of controller 600 of FIG. 6. In some embodiments, process 1100 may be included in process 700 e.g., between operation 702 and operation 706. In some embodiments, process 1100 may include or follow one or more steps of process 900 when process 900 is included in process 700.

At operation 1102, a subset of interest of channel-capacitance measurements is identified. The subset of interest of the channel-capacitance measurements is associated with sensor locations that correspond to an area of interest. The channel-capacitance measurements, and the subset of interest of the channel-capacitance measurements, may be optionally quantized. The area of interest may be related to an object in proximity of the capacitive sensor. In particular, the area of interest may be related to the plurality of detectable elements in a predetermined spatial pattern in or on the object. In some embodiments, the subset of interest of the channel-capacitance measurements identified at operation 1102 is identified by a process similar to, or the same as, what was described above with regard to operation 902, operation 904, and/or operation 906 of FIG. 9.

At operation 1104, a spatial correspondence between at least three channel-capacitance measurements of the subset of interest of the channel-capacitance measurements and at least three data points of an orientation schema is optionally determined. As a non-limiting example, referring to FIG. 10, a spatial correspondence between corner channel-capacitance measurements 1008 and corner data points 1018 is determined.

At operation 1106, a spatial relationship between the area of interest and the capacitive sensor is determined. Optionally, the spatial relationship is based on the spatial correspondence determined at operation 1104. As a non-limiting example, referring to FIG. 10, the spatial relationship includes identifying a correspondence between a relative "north" of the area of interest (which is associated with the second channel-capacitance measurements) and a corresponding "north" of the capacitive sensor. Additionally, the spatial relationship includes a positional spatial relationship, e.g., where on the capacitive sensor is the area of interest.

At operation 1108, an object identifier is generated at least partially in response to the channel-capacitance measurements (e.g., the subset of interest of channel-capacitance measurements) and at least partially in response to the spatial relationship.

Figure 12:
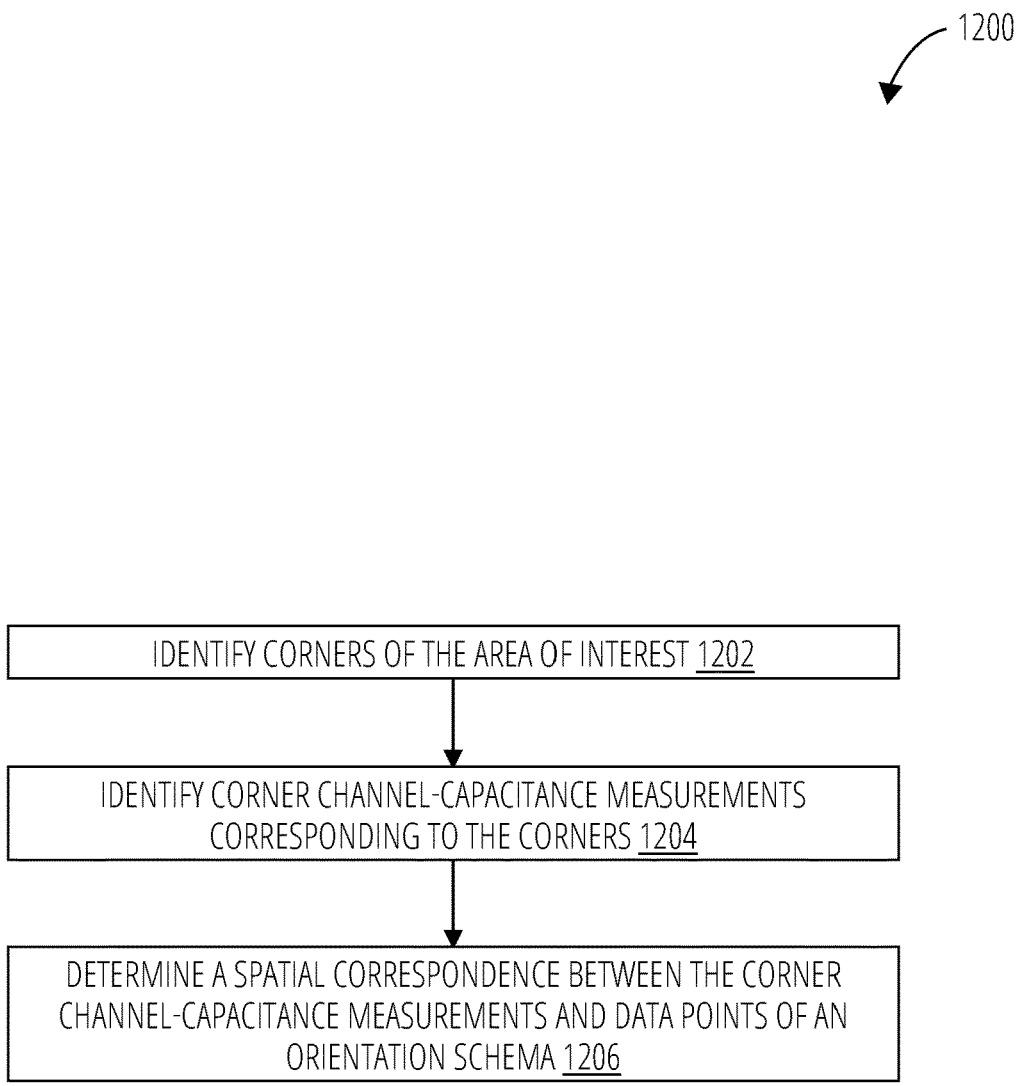
FIG. 12 illustrates a process in accordance with one or more embodiments.

FIG. 12 illustrates process 1200 in accordance with one or more embodiments. In some embodiments, one or more operations of process 1200 may be performed by or using elements of controller 600 of FIG. 6. In some embodiments, process 1200 may be included in process 700, e.g., between operation 702 and operation 706. In some embodiments, process 1200 be included in process 1100, e.g., between and/or as part of operation 1104 and operation 1106.

At operation 1202, corners of the area of interest are identified. As a non-limiting example, referring to FIG. 10, one or more corners, e.g., corner 1014 are identified.

At operation 1204, corner channel-capacitance measurements are identified. The corner channel-capacitance measurements correspond to the corners identified at operation 1202. As a non-limiting example, referring to FIG. 10, corner channel-capacitance measurements 1008 are identified. The corner channel-capacitance measurements may be optionally quantized, or may not be quantized.

At operation 1206, a spatial correspondence between the corner channel-capacitance measurements and data points of an orientation schema is determined. As a non-limiting example, referring to FIG. 10, a spatial correspondence between corner channel-capacitance measurements 1008 and corner data points 1018 is determined.

Figure 13:
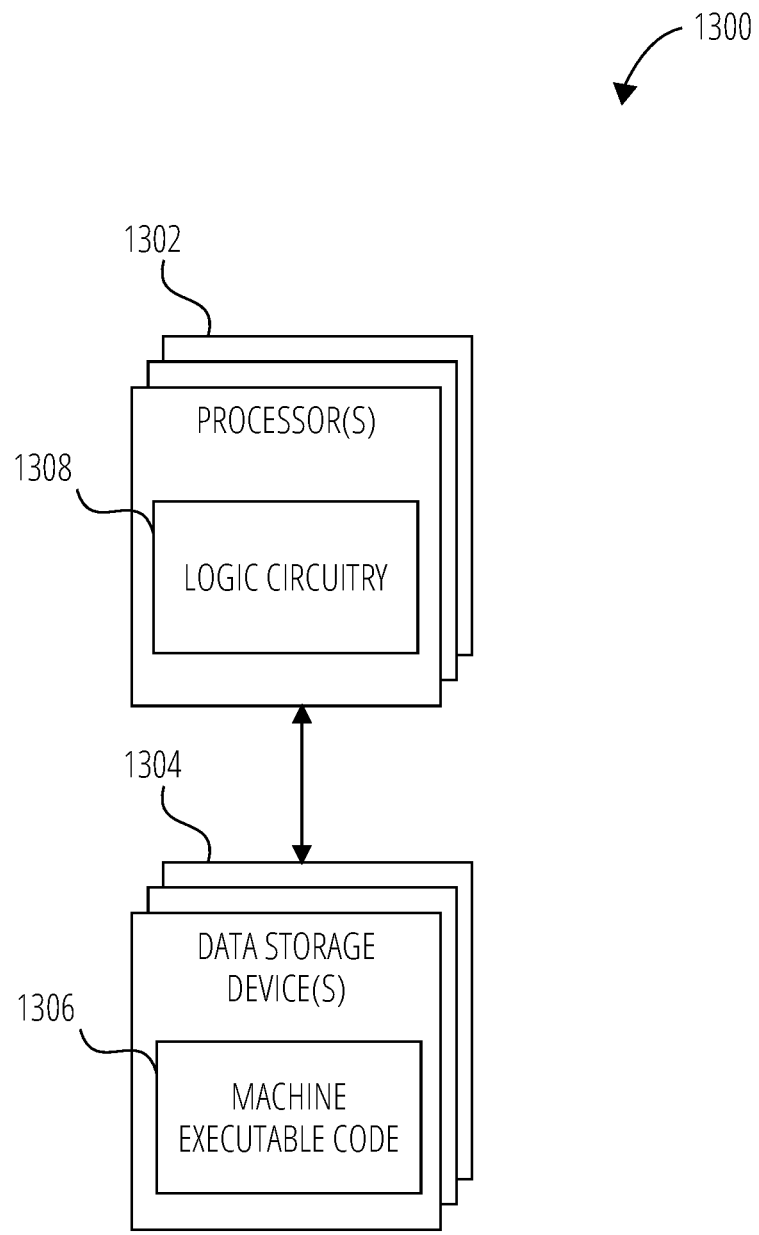
FIG. 13 illustrates a block diagram of circuitry that may be used to implement various functions, operations, acts, processes, and/or methods, in accordance with one or more embodiments.

FIG. 13 is a block diagram of circuitry 1300 that, in some embodiments, may be used to implement various functions, operations, acts, processes, and/or methods disclosed herein. Circuitry 1300 includes one or more processors 1302 (sometimes referred to herein as "processors 1302") operably coupled to one or more apparatuses such as data storage devices (sometimes referred to herein as "storage 1304"), without limitation. Storage 1304 includes machine-executable code 1306 stored thereon (e.g., stored on a computer-readable memory) and processors 1302 include logic circuitry 1308. Machine-executable code 1306 include information describing functional elements that may be implemented by (e.g., performed by) logic circuitry 1308. Logic circuitry 1308 is adapted to implement (e.g., perform) the functional elements described by machine-executable code 1306. Circuitry 1300, when executing the functional elements described by machine-executable code 1306, should be considered as special purpose hardware configured for carrying out functional elements disclosed herein. In some embodiments, processors 1302 may be configured to perform the functional elements described by machine-executable code 1306 sequentially, concurrently (e.g., on one or more different hardware platforms), or in one or more parallel process streams.

When implemented by logic circuitry 1308 of processors 1302, machine-executable code 1306 is configured to adapt processors 1302 to perform operations of embodiments disclosed herein. For example, machine-executable code 1306 may be configured to adapt processors 1302 to perform at least a portion or a totality of process 200, process 500, process 700, process 900, process 1100, and/or process 1200. As another example, machine-executable code 1306 may be configured to adapt processors 1302 to perform at least a portion or a totality of the operations discussed with reference to object-recognition system 114, object-recognition system 300, and/or controller 600, and more specifically, one or more of controller 104, controller 302, and/or controller 600. As a specific, non-limiting example, the computer-readable instructions may be configured to instruct processors 1302 to perform at least some functions of capacitive-sensor-button controller 310, recognizer 304, reader 606, and/or recognizer 602, as discussed herein.

Processors 1302 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is configured to execute computing instructions (e.g., software code) related to embodiments of the present disclosure. It is noted that a general-purpose processor (may also be referred to herein as a host processor or simply a host) may be a microprocessor, but in the alternative, processors 1302 may include any conventional processor, controller, microcontroller, or state machine. Processors 1302 may also be implemented as a combination of computing devices, such as a combination of a DSP and a microprocessor, a plurality of microprocessors, one or more microprocessors in conjunction with a DSP core, or any other such configuration.

In some embodiments, storage 1304 includes volatile data storage (e.g., random-access memory (RAM)), non-volatile data storage (e.g., Flash memory, a hard disc drive, a solid state drive, erasable programmable read-only memory (EPROM), etc.). In some embodiments, processors 1302 and storage 1304 may be implemented into a single device (e.g., a semiconductor device product, a system on chip (SOC), etc.). In some embodiments, processors 1302 and storage 1304 may be implemented into separate devices.

In some embodiments, machine-executable code 1306 may include computer-readable instructions (e.g., software code, firmware code). By way of non-limiting example, the computer-readable instructions may be stored by storage 1304, accessed directly by processors 1302, and executed by processors 1302 using at least logic circuitry 1308. Also by way of non-limiting example, the computer-readable instructions may be stored on storage 1304, transmitted to a memory device (not shown) for execution, and executed by processors 1302 using at least logic circuitry 1308. Accordingly, in some embodiments, logic circuitry 1308 includes electrically configurable logic circuitry 1308.

In some embodiments, machine-executable code 1306 may describe hardware (e.g., circuitry) to be implemented in logic circuitry 1308 to perform the functional elements. This hardware may be described at any of a variety of levels of abstraction, from low-level transistor layouts to high-level description languages. At a high-level of abstraction, a hardware description language (HDL) such as an Institute of Electrical and Electronics Engineers (IEEE) Standard hardware description language (HDL) may be used, without limitation. By way of non-limiting examples, VERILOG™, SYSTEMVERILOG™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of logic circuitry 1308 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some embodiments, machine-executable code 1306 may include an HDL, an RTL, a GL description, a mask level description, other hardware description, or any combination thereof.

In embodiments where machine-executable code 1306 includes a hardware description (at any level of abstraction), a system (not shown, but including storage 1304) may be configured to implement the hardware description described by machine-executable code 1306. By way of non-limiting example, processors 1302 may include a programmable logic device (e.g., an FPGA or a PLC) and logic circuitry 1308 may be electrically controlled to implement circuitry corresponding to the hardware description into logic circuitry 1308. Also by way of non-limiting example, logic circuitry 1308 may include hard-wired logic manufactured by a manufacturing system (not shown, but including storage 1304) according to the hardware description of machine-executable code 1306.

Regardless of whether machine-executable code 1306 includes computer-readable instructions or a hardware description, logic circuitry 1308 is adapted to perform the functional elements described by machine-executable code 1306 when implementing the functional elements of machine-executable code 1306. It is noted that although a hardware description may not directly describe functional elements, a hardware description indirectly describes functional elements that the hardware elements described by the hardware description are capable of performing.

In the present disclosure, certain shapes have been repeatedly illustrated and described. This is not meant to be limiting. Rather, any suitable shape is within the scope of the present disclosure. As a specific non-limiting example, although the sensing lines have been illustrated and described as forming an x-y grid, in some embodiments, the sensing lines may be laid out in a triangular or half-square grid. Additionally or alternatively, the channel-capacitance measurements, the recognition schema and/or the orientation schema may be laid out in a similar fashion. Additionally or alternatively, although the object has been described and illustrated as having detectable elements arranged in a two-dimensional x-y grid, in some embodiments, the detectable elements may be arranged according to a triangular, hexagonal, or half-square grid.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting embodiments of the disclosure may include:

Embodiment 1: A method, comprising: capturing a channel-capacitance measurement via a capacitive sensor when an object is in proximity of the capacitive sensor, the object including a plurality of detectable elements in a predetermined spatial pattern; and generating an object identifier at least partially responsive to the captured channel-capacitance measurement.

Embodiment 2: The method of Embodiment 1, wherein the generating the object identifier at least partially responsive to the captured channel-capacitance measurement comprises: identifying activated sensor buttons at least partially responsive to a subset of interest of the captured channel-capacitance measurement that are indicative of proximity of the object; and generating a button-status report at least partially responsive to the activated sensor buttons, and wherein the generating the object identifier is at least partially responsive to the button-status report.

Embodiment 3: The method of Embodiments 1 and 2, wherein the generating the object identifier at least partially responsive to the button-status report comprises: traversing a generated button-status report according to a button-traversal schema; and generating the object identifier at least partially responsive to the traversal.

Embodiment 4: The method of Embodiments 1 to 3, wherein the capturing the channel-capacitance measurement comprises capturing the channel-capacitance measurement during a time period corresponding to a reading cycle.

Embodiment 5: The method of Embodiments 1 to 4, comprising: identifying edges defining an area of interest; identifying sensor locations associated with the area of interest; and identifying a subset of interest of the captured channel-capacitance measurement associated with the sensor locations, wherein the generating the object identifier is at least partially responsive to the subset of interest of the captured channel-capacitance measurement.

Embodiment 6: The method of Embodiments 1 to 5, comprising quantizing the captured channel-capacitance measurement according to at least three quantization levels, wherein the generating the object identifier at least partially responsive to the captured channel-capacitance measurement comprises generating the object identifier at least partially responsive to quantized captured channel-capacitance measurement.

Embodiment 7: The method of Embodiments 1 to 6, comprising: identifying a subset of interest of the captured channel-capacitance measurement associated with sensor locations that correspond to an area of interest; and determining a spatial relationship between the area of interest and the capacitive sensor; and wherein the generating the object identifier at least partially responsive to the captured channel-capacitance measurement comprises generating the object identifier at least partially responsive to the spatial relationship.

Embodiment 8: The method of Embodiments 1 to 7, comprising: determining a spatial correspondence between at least three of the captured channel-capacitance measurement of the subset of interest of the captured channel-capacitance measurement and at least three data points of an orientation schema, wherein the determining the spatial relationship between the area of interest and the capacitive sensor is at least partially responsive to the spatial correspondence.

Embodiment 9: The method of Embodiments 1 to 8, comprising: identifying corners of the area of interest; and identifying corner channel-capacitance measurement corresponding to the corners; and determining a spatial correspondence between the corner channel-capacitance measurement and data points of an orientation schema, wherein the determining the spatial relationship is at least partially responsive to the spatial correspondence.

Embodiment 10: A controller, the controller comprising: a capacitive-sensor-button controller configured to provide a button-status report at least partially responsive to proximity of an object to specified areas of a capacitive sensor, the object including a plurality of detectable elements in a predetermined spatial pattern; and a recognizer configured to generate an object identifier at least partially responsive to the button-status report, the object identifier based at least partially on the predetermined spatial pattern of the plurality of detectable elements of the object.

Embodiment 11: The controller of Embodiment 10, wherein the button-status report comprises activated-capacitive-sensor-button indicators, the activated-capacitive-sensor-button indicators indicative of the specified areas for which the plurality of detectable elements are in proximity during a time period corresponding to a reading cycle.

Embodiment 12: The controller of Embodiments 10 and 11, wherein the recognizer comprises a recognition schema, the recognition schema comprising instructions for generating the object identifier at least partially responsive to the activated-capacitive-sensor-button indicators.

Embodiment 13: The controller of Embodiments 10 to 12, wherein the recognition schema comprises an encoder, the encoder comprising instructions for traversing the activated-capacitive-sensor-button indicators when generating the object identifier.

Embodiment 14: The controller of Embodiments 10 to 13, wherein the controller is implemented by a microcontroller or microprocessor.

Embodiment 15: A controller, the controller comprising: a reader configured to capture a channel-capacitance measurement via a capacitive sensor when an object having a plurality of detectable elements in a predetermined spatial pattern is in proximity of the capacitive sensor; and a recognizer configured to generate an object identifier at least partially responsive to the captured channel-capacitance measurement.

Embodiment 16: The controller of Embodiment 15, wherein the captured channel-capacitance measurement comprise capacitance values, each of the capacitance values measured at a sensor location of the capacitive sensor during a time period corresponding to a reading cycle.

Embodiment 17: The controller of Embodiments 15 and 16, wherein the reader comprises a quantizer configured to quantize the captured channel-capacitance measurement according to at least three quantization levels, wherein the recognizer is configured to generate the object identifier at least partially responsive to a quantized captured channel-capacitance measurement.

Embodiment 18: The controller of Embodiments 15 to 17, wherein the recognizer comprises an area-of-interest identifier configured to identify a subset of interest of the captured channel-capacitance measurement that correspond to an area of interest, the area of interest related to the object in proximity of the capacitive sensor, wherein the recognizer is configured to generate the object identifier at least partially responsive to the subset of interest of the captured channel-capacitance measurement.

Embodiment 19: The controller of Embodiments 15 to 18, wherein the area-of-interest identifier comprises an edge detector configured to detect one or more edges of the area of interest, and wherein the area-of-interest identifier is configured to define the area of interest at least partially responsive to the one or more edges.

Embodiment 20: The controller of Embodiments 15 to 19, wherein the recognizer comprises an orientation identifier configured to generate orientation information indicative of a spatial relationship between the object and the capacitive sensor, wherein the recognizer is configured to generate the object identifier at least partially responsive to a generated orientation information.

Embodiment 21: The controller of Embodiments 15 to 20, wherein the controller is implemented by a microcontroller or microprocessor.

Embodiment 22: An object-recognition system comprising: a capacitive sensor; a reader configured to capture a channel-capacitance measurement when an object having a plurality of detectable elements in a predetermined spatial pattern is in proximity to the capacitive sensor; and a recognizer configured to determine an object identifier at least partially responsive to the captured channel-capacitance measurement.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A method, comprising:
capturing a channel-capacitance measurement via a capacitive sensor when at least a portion of a module is in proximity to the capacitive sensor when the module is attached to a modular system, the modular system comprising a tool or appliance, the module comprising an attachment for the tool or appliance, a replacement part for the tool or appliance, or a container of a consumable product to be consumed by the tool or appliance, the portion of the module including a plurality of detectable elements in a predetermined spatial pattern;
generating an object identifier at least partially responsive to the captured channel-capacitance measurement; and
identifying the module by identifying the attachment responsive to the object identifier, identifying the replacement part responsive to the object identifier, or identifying the container responsive to the object identifier.

2. A method, comprising:
capturing a channel-capacitance measurement via a capacitive sensor when at least a portion of a module is in proximity to the capacitive sensor when the module is attached to a modular system, the modular system comprising a tool or appliance, the module comprising an attachment for the tool or appliance, a replacement part for the tool or appliance, or a container for a consumable product to be consumed by the tool or appliance, the portion of the module including a plurality of detectable elements in a predetermined spatial pattern;

generating an object identifier at least partially responsive to the captured channel-capacitance measurement; and validating the module by validating the attachment as valid for attachment for the tool or appliance responsive to the object identifier, validating the replacement part as a valid replacement part for the tool or appliance responsive to the object identifier, or validating the container as a valid container responsive to the object identifier.

3. A controller for a modular system, the modular system comprising a tool or appliance, the controller comprising:
a reader to capture a channel-capacitance measurement via a capacitive sensor;
a capacitive-sensor-button controller to provide a button-status report at least partially responsive to the captured channel-capacitance measurement when a portion of a module having a plurality of detectable elements in a predetermined spatial pattern is in proximity to the capacitive sensor when the module is attached to the modular system the module comprising an attachment for the tool or appliance or a replacement part for the tool or appliance; and
a recognizer to generate an object identifier at least partially responsive to the button-status report, the object identifier based at least partially on the predetermined spatial pattern of the plurality of detectable elements of the portion;
wherein the controller to identify or validate the attachment or the replacement part responsive to the object identifier.

4. A controller for a modular system, the modular system comprising a tool or appliance, the controller comprising:
a reader to capture a channel-capacitance measurement via a capacitive sensor;
a capacitive-sensor-button controller to provide a button-status report at least partially responsive to the captured channel-capacitance measurement when a portion of a module having a plurality of detectable elements in a predetermined spatial pattern is in proximity to the capacitive sensor when the module is attached to the modular system, the module comprising a container of a consumable product to be consumed by the tool or appliance; and
a recognizer to generate an object identifier at least partially responsive to the button-status report, the object identifier based at least partially on the predetermined spatial pattern of the plurality of detectable elements of the portion, the controller to identify or validate the container responsive to the object identifier.

5. A controller for a modular system, the modular system comprising a tool or appliance, the controller comprising:
a reader to capture a channel-capacitance measurement via a capacitive sensor when a portion of a module having a plurality of detectable elements in a predetermined spatial pattern is in proximity to the capacitive sensor when the module is attached to the modular system, the module comprising an attachment for the tool or appliance or a replacement part for the tool or appliance; and
a recognizer to generate an object identifier at least partially responsive to the captured channel-capacitance measurement, the controller to identify or validate the attachment or replacement part responsive to the object identifier.

6. A controller for a modular system, the modular system comprising a tool or appliance, the controller comprising:
a reader to capture a channel-capacitance measurement via a capacitive sensor when a portion of a module having a plurality of detectable elements in a predetermined spatial pattern is in proximity to the capacitive sensor when the module is attached to the modular system, the module comprising a container of a consumable product to be consumed by the tool or appliance; and
a recognizer to generate an object identifier at least partially responsive to the captured channel-capacitance measurement, the controller to identify or validate the container responsive to the object identifier.

7. A modular system comprising a tool or appliance, the modular system comprising:
a module comprising an attachment for the tool or appliance or a replacement part for the tool or appliance, the module to be attached to the modular system, the module comprising a portion having a plurality of detectable elements in a predetermined spatial pattern arranged therein;
an object-recognition system comprising:
a capacitive sensor, the portion of the module to be in proximity to the capacitive sensor when the module is attached to the modular system;
a reader to capture a channel-capacitance measurement when the portion of the module is in proximity to the capacitive sensor; and
a recognizer to determine an object identifier at least partially responsive to the captured channel-capacitance measurement, the object-recognition system to identify or validate the attachment or the replacement part responsive to the object identifier.

8. The modular system of claim 7, the detectable elements arranged at varying depths within the portion of the module.

9. A modular system comprising a tool or appliance, the modular system comprising:
a module comprising a container of a consumable product, the modular system to consume the consumable product, the module to be attached to the modular system, the module comprising a portion having a plurality of detectable elements in a predetermined spatial pattern arranged therein;
an object-recognition system comprising:
a capacitive sensor, the portion of the module to be in proximity to the capacitive sensor when the module is attached to the modular system;
a reader to capture a channel-capacitance measurement when the portion of the module is in proximity to the capacitive sensor; and
a recognizer to determine an object identifier at least partially responsive to the captured channel-capacitance measurement, the object-recognition system to identify or validate the container responsive to the object identifier.

10. The modular system of claim 9, the detectable elements arranged at varying depths within the portion of the module.

\* \* \* \* \*